United States Patent [19]

Gibbon et al.

[11] 3,900,846
[45] Aug. 19, 1975

[54] COMPUTER AUTOMATED RADAR TERMINAL SYSTEM

[75] Inventors: John Gibbon, Morris Plains; Burt Heacock, Berkeley Heights; Richard Lipnick, Scotch Plains; John Strenkowski, Wippany; Matthew Tutino, Basking Ridge, all of N.J.

[73] Assignee: Lockheed Electronics Co., Inc., Plainfield, N.J.

[22] Filed: Jan. 14, 1974

[21] Appl. No.: 432,885

[52] U.S. Cl. ............ 343/6 R; 343/5 EM; 343/5 DP; 343/6.5 LC; 343/6.5 R; 343/112 TC
[51] Int. Cl. ............................................. G01s 9/56
[58] Field of Search........... 343/6 R, 112 TC, 5 EM, 343/5 DP, 6.5 LC, 6.5 R; 340/23, 24, 27 NA

[56] References Cited
UNITED STATES PATENTS

| | | | |
|---|---|---|---|
| 3,058,104 | 10/1962 | Garfinkel et al. | 340/24 |
| 3,109,170 | 10/1963 | Greene, Jr. et al. | 343/112 TC |
| 3,403,391 | 9/1968 | McCown | 343/5 EM |
| 3,688,312 | 8/1972 | Gustafson et al. | 343/6 R |

*Primary Examiner*—Maynard R. Wilbur
*Assistant Examiner*—G. E. Montone
*Attorney, Agent, or Firm*—Stephen B. Judlowe

[57] ABSTRACT

An automated radar terminal system employs primary (non-cooperative) and secondary (cooperating transponder) surveillance radar equipment to monitor the ensemble of aircraft disposed within a subject air space.

A data acquisition subsystem supplies detected and verified aircraft transponder-emitted beacon messages, and derived parameters which characterize each message such as aircraft range and azimuth, to a data processing subsystem. The central processor and memory structure there included maintain the interrelated target scratch pad, data base and multiple display files for accurately and efficiently presenting flexible combined primary radar video-alpha-numeric displays which typically vary at each of plural controller display stations.

45 Claims, 11 Drawing Figures

SYSTEM BLOCK DIAGRAM

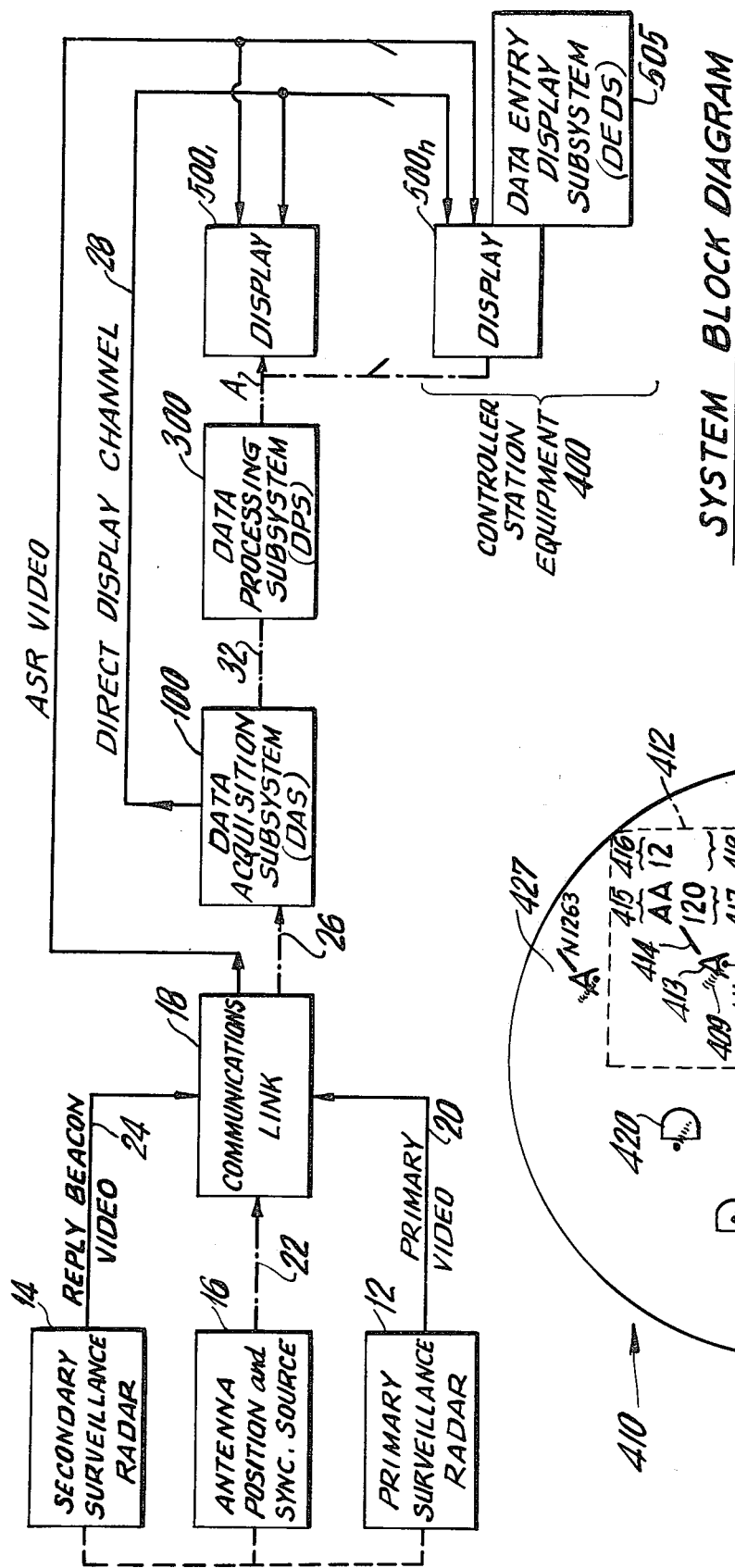
FIG. 1 SYSTEM BLOCK DIAGRAM
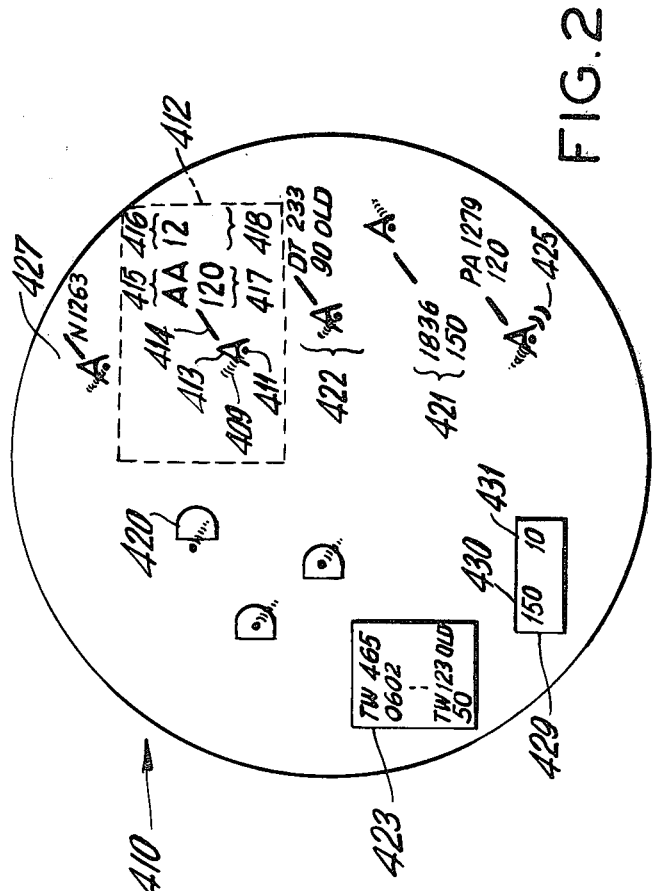
FIG. 2

FIG. 3 DATA ACQUISITION SUBSYSTEM 100

DISPLAY 500

FLOW CHART OF TARGET RETURN DATA PROCESSING

COMPUTER AUTOMATED RADAR TERMINAL SYSTEM

DISCLOSURE OF INVENTION

This invention relates to electronic air traffic monitoring apparatus and, more specifically, to an improved computer automated radar terminal system.

It is an object of the present invention to provide improved automated apparatus for processing and displaying returns from primary and secondary air surveillance radar equipment monitoring air traffic in a zone of interest.

More specifically, an object of the present invention is the provision of an automated radar terminal system (ARTS) with improved data acquisition subsystem structure for processing transponder beacon returns, and which employs improved data processing file organization, creation and maintenance to operate upon the system input operands in the coincident creation of plural air traffic controller displays.

The above and other objects of the present invention are realized in a specific, illustrative automated radar terminal system (ARTS) which receives the waves recovered by primary and secondary (beacon-transponder cooperative) radar equipment, together with timing and radar antenna azimuth reporting signals. The system includes a data acquisition subsystem for verifying, regenerating and, in some cases, separating overlapped beacon video returns, and for generating derived quantities characterizing each beacon return, such as range and azimuth.

A data processing subsystem advantageously includes a central processor with hierarchal interrupt structure, and a memory having at least a portion with a direct access capability. The memory thus receives data from the acquisition subsystem on a high speed basis (responsive to a proper interrupt) without requiring central process supervision.

The system includes a plurality of displays adapted for different air traffic controller positions. The processor memory has display storage allotted to each display, refreshing each display on an interrupt, direct memory access basis.

The data processing subsystem maintains a target scratch pad file in CPU memory ordered by range, and a main data base file organized on a hash list, pointer linked basis containing air craft target blocks declared from the scratch pad. Pointers are maintained from an aircraft's appearance in the main data base to comparable typically multiple appearances in display storage such that aircraft data (and thereby also its display appearances) may be rapidly and efficiently updated. Further the pointer linked main data base arrangement obviates the requirement for time consuming data relocation as aircraft enter and leave the monitored air space.

The above and other features and advantages of the present invention will become more clear from the following detailed description of a specific illustrative embodiment thereof, presented hereinbelow in conjunction with the accompanying drawing, in which:

FIG. 1 is an overall block diagram of an automated radar terminal system employing the principles of the present invention;

FIG. 2 is an illustrative display at an aircraft controller station in accordance with the principles of the present invention;

Figure 3:
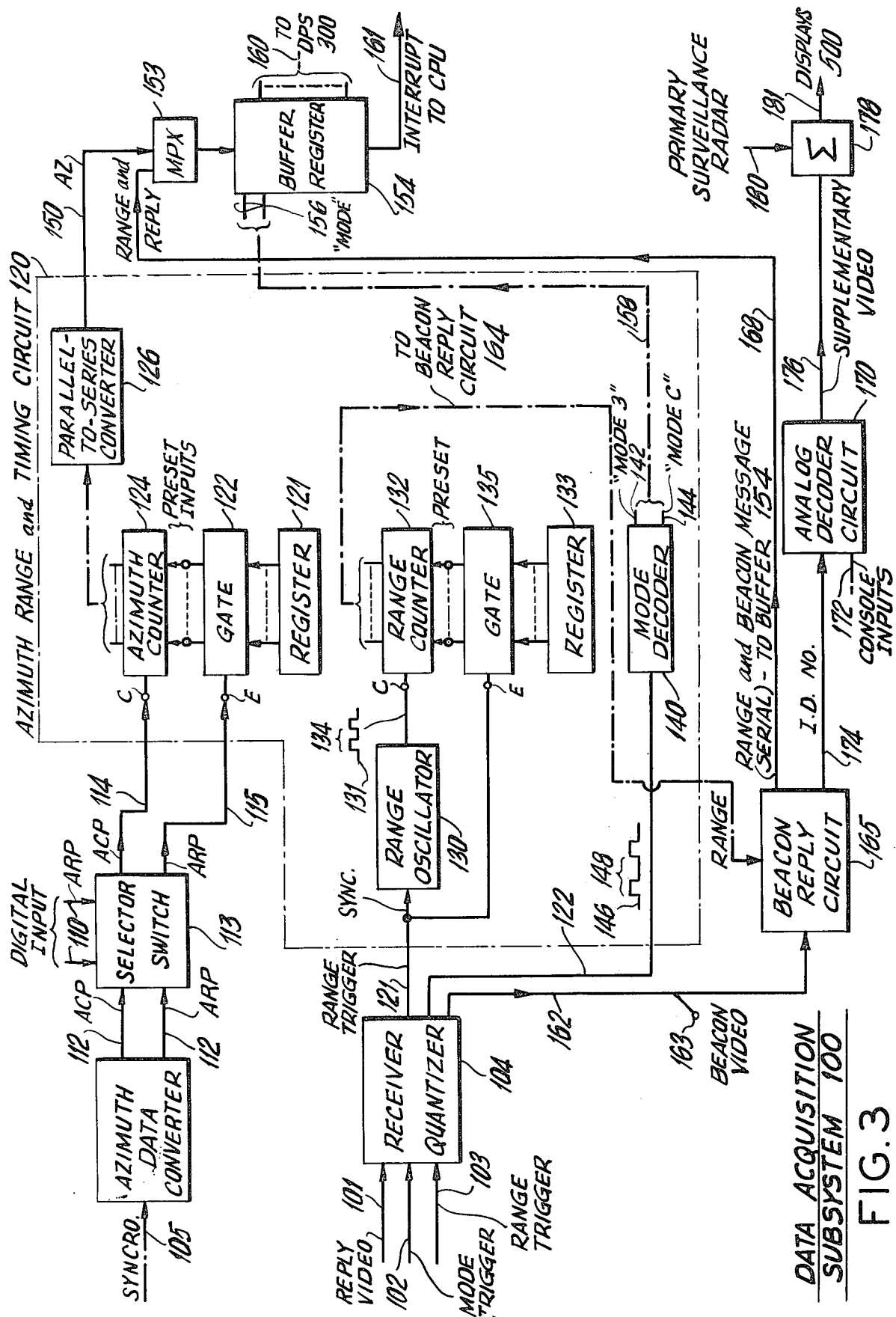
FIG. 3 depicts a data acquisition subsystem 100 employed in the system arrangement of FIG. 1.
Figure 4:
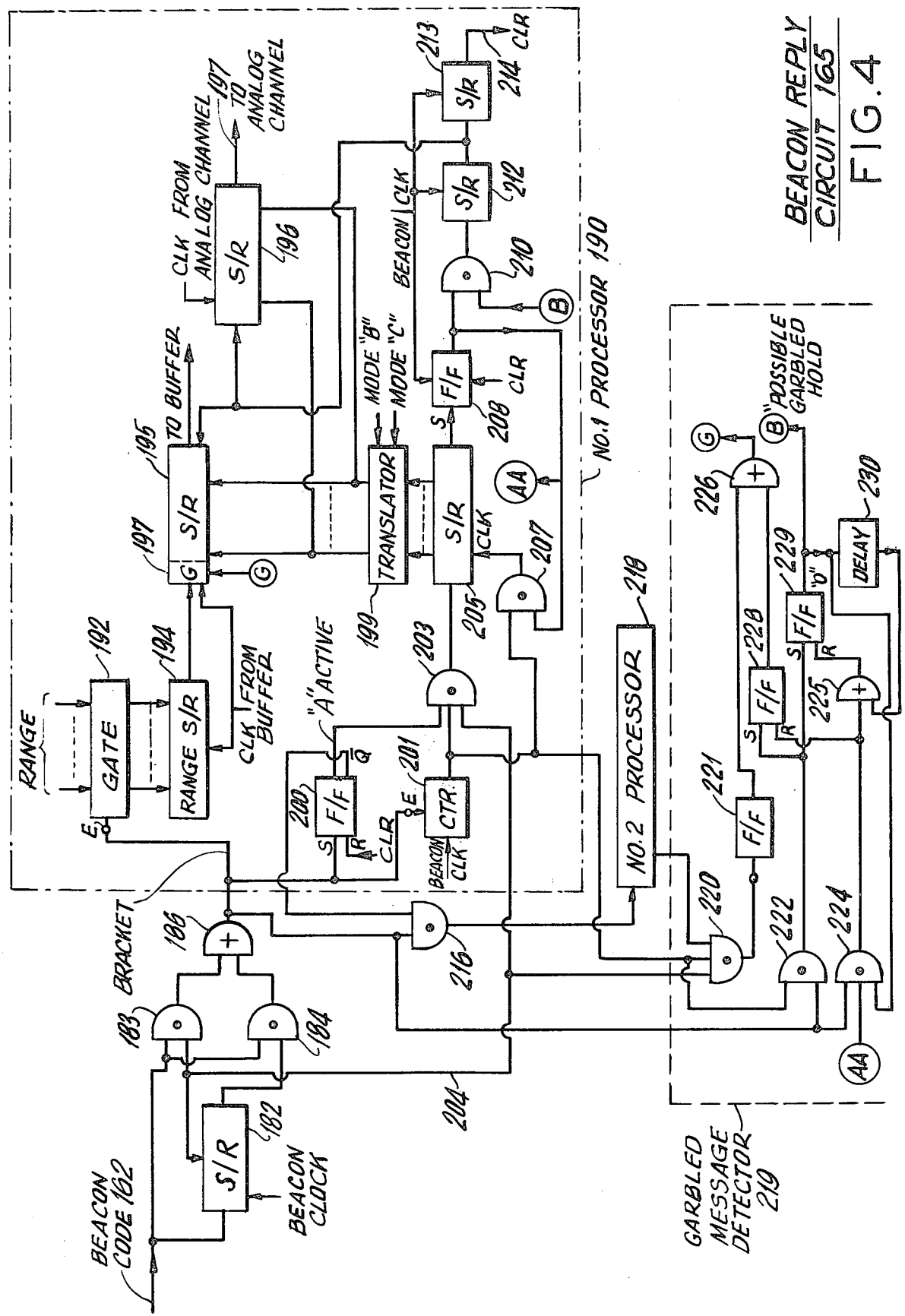
Figure 5:
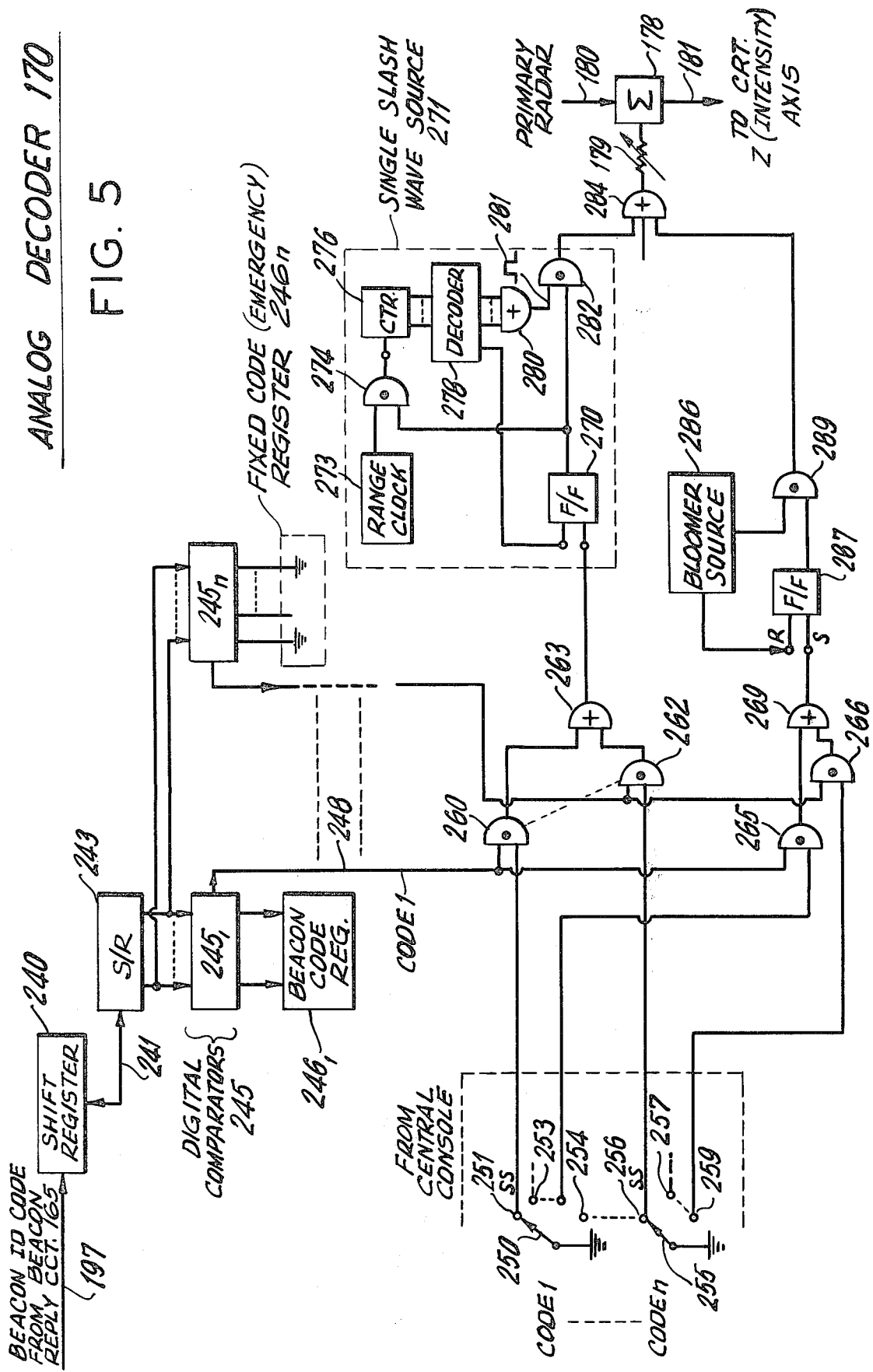
Figure 6:
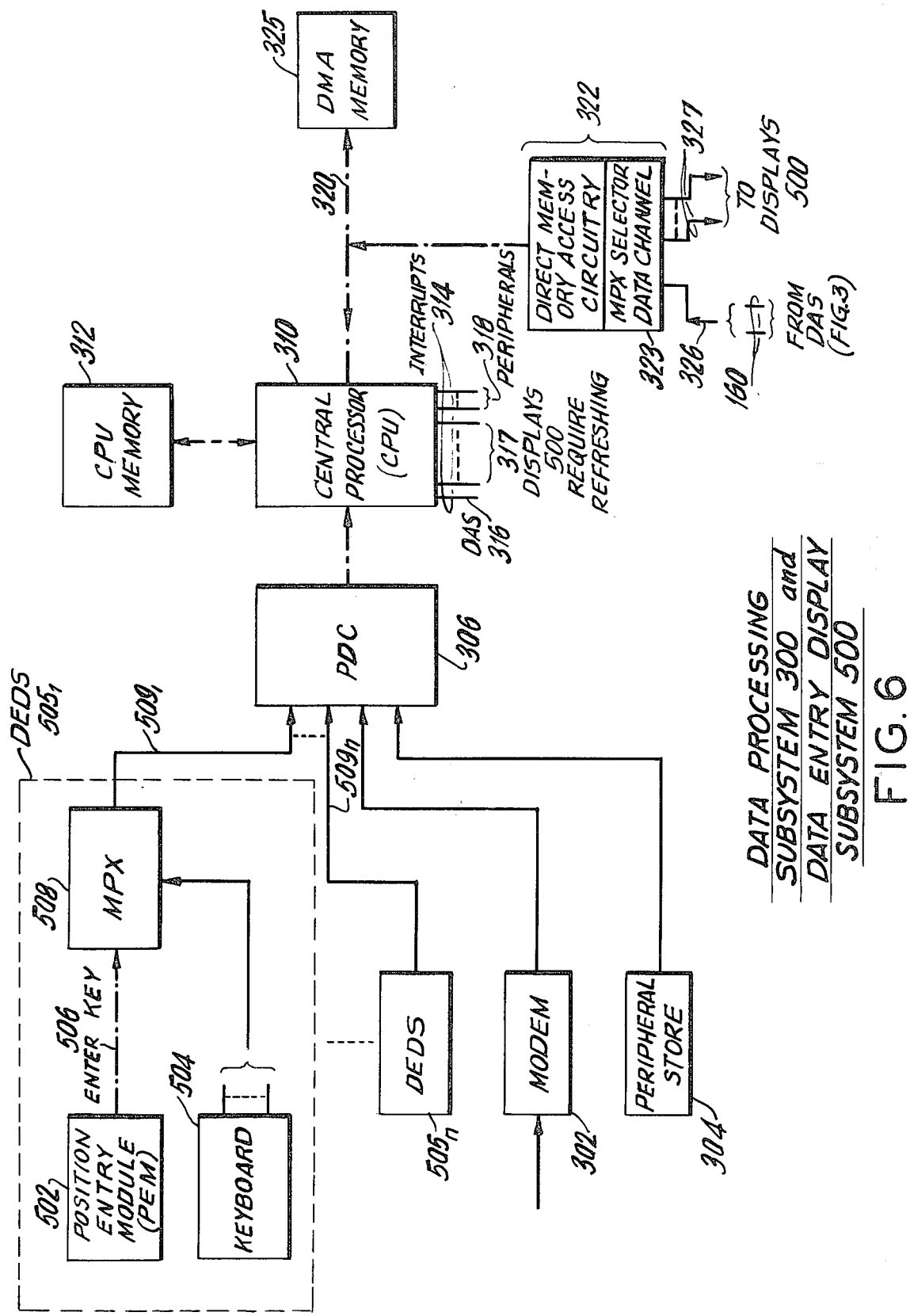
Figure 7:
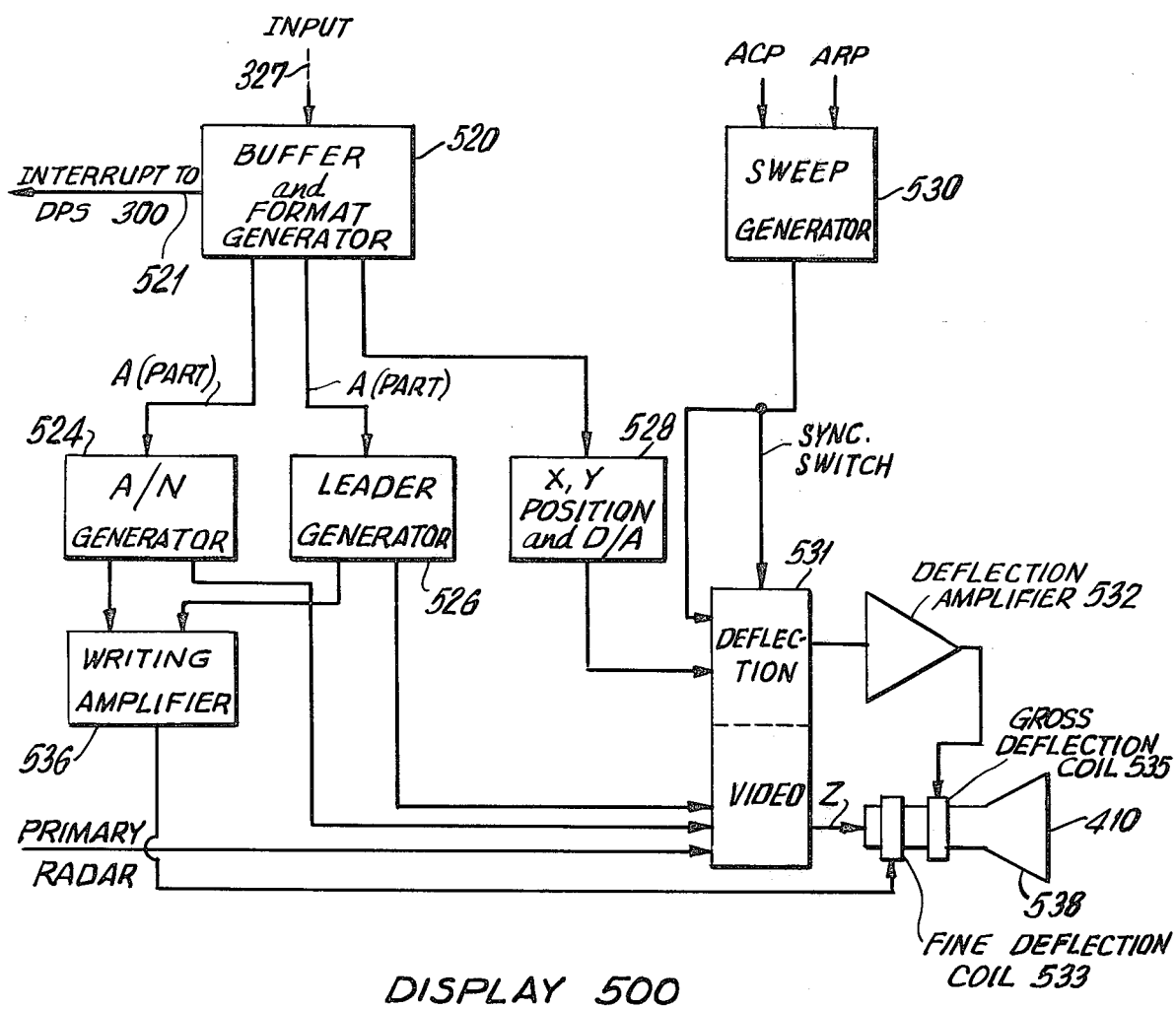
Figure 9:
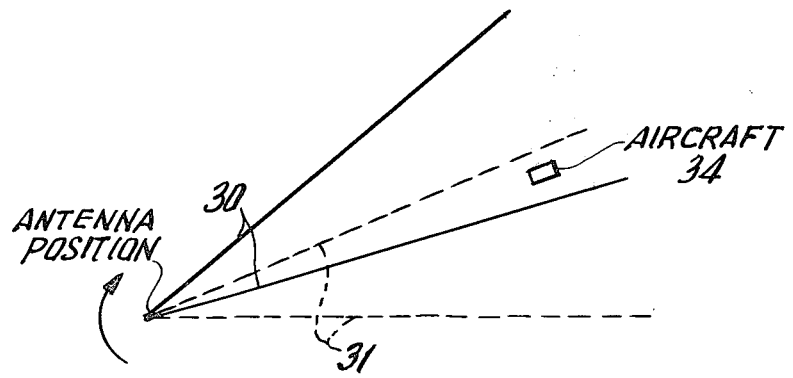
Figure 8:
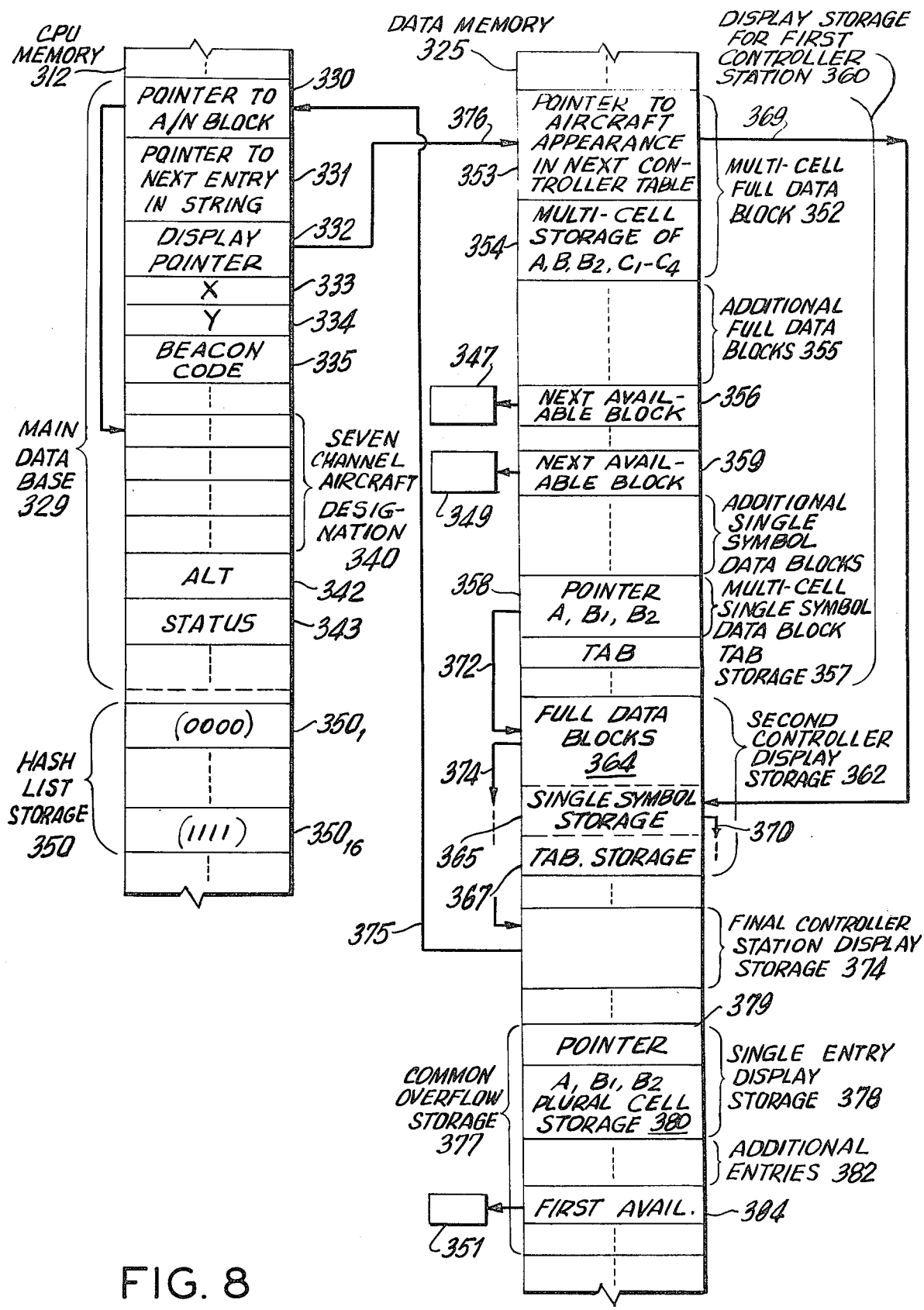
Figure 10:
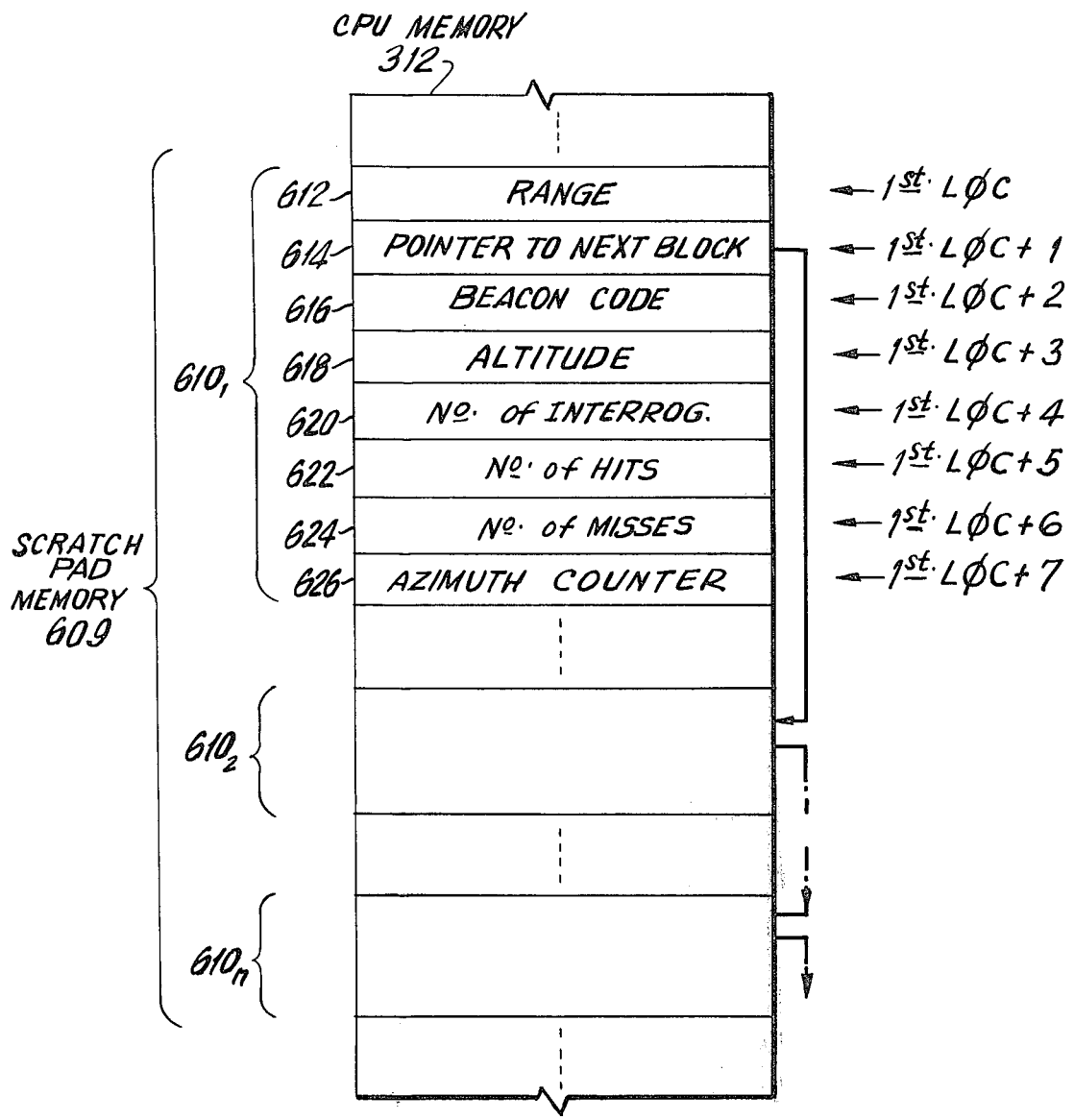
Figure 11:
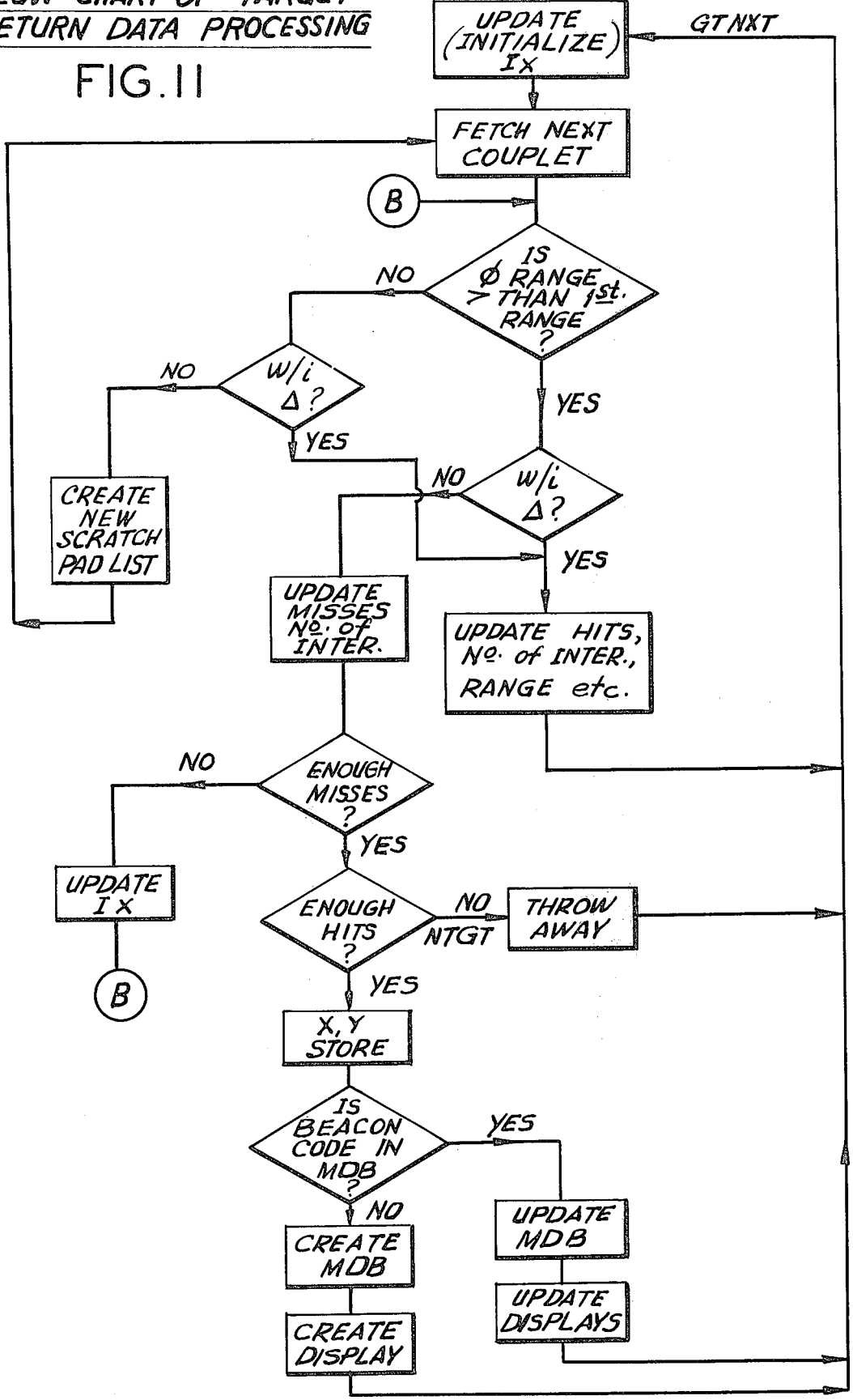

FIG. 4 is a beacon reply circuit 165 utilized in the data acquisition subsystem 100 of FIGS. 1 and 3;

FIG. 5 depicts an analog decoder circuit 170 employed in the data acquisition subsystem 100 of FIGS. 1 and 3;

FIG. 6 illustrates a data processing subsystem 300 and an illustrative data entry display system 500 included in the system arrangement of FIG. 1;

FIG. 7 depicts an illustrative display 500 employed in the system arrangement of FIG. 1;

FIG. 8 is a diagram illustrating main data base and display storage in a CPU memory 312 and a DMA memory 325 of FIG. 6;

FIG. 9 characterizes the spatial relationship between a radar target, and a bean sweeping pattern for purposes discussed;

FIG. 10 illustrates storage in a further portion of the CPU memory 312 of FIG. 6 for target scratch pad data storage blocks; and FIG. 11 is a flow chart depicting central processor treatment of secondary surveillance radar returns, with their attendant derived information.

Referring now to the drawing, and more particularly to FIG. 1, there is shown in general block diagram form a specific illustrative computer automated radar terminal system (ARTS), i.e., a system for presenting at plural aircraft controller consoles a visual presentation of the air traffic within a desired locality, the presentation made to differing controllers in general being different. Thus, for example, the system arrangement of FIG. 1 may be used to monitor (and thereby control) air traffic in the vicinity of an airport or airport cluster. The group of air traffic controllers who monitor traffic within the airport zone are, in general, functionally subdivided, as by responsibility for arrivals vis-a-vis departures; differing segments of the total air space; or the like. Accordingly, a more complete alpha-numeric presentation is made for the aircraft associated with each controller station, i.e., those for which the controller is responsible.

The FIG. 1 system employs as signal input equipment a primary air surveillance radar (ASR) 12 of any conventional type. The primary surveillance radar 12 rotates, and periodically emits relatively narrow (in both beam dispersion and time) pulses of radio frequency energy. A portion of the emitted energy is reflected from the "skin" or outer frame of each aircraft upon which the radio frequency impinges. The return signals are then detected during a receive portion of the radar transmit-receive cycle. As is conventional, the time of arrival of each return signal relative to the transmitted burst identifies each particular aircraft as being at a specific slant range distance from the antenna. Further, the aircraft is thus located at an azimuth from the airport corresponding to the instantaneous rotational position of the radar antenna, which may be treated for present purposes as having no substantial motion during a transmit-receive cycle. This return video signal recovered by the primary surveillance radar is supplied via a communication link 18 (e.g., a simple coaxial cable or other land line if the radar is located near the remainder of the FIG. 1 system or, alternatively, a microwave link or the like) to the remainder of the FIG. 1 system.

As is also conventional for aircraft monitor/control radar systems (and others as well), an antenna positioning and synchronizing reporting source 16 communicates various information to the FIG. 1 signal processing apparatus via the communications link 18 to characterize the status of the radar equipment. More specifically, in one form of azimuth reporting, the radar pedestal equipment 16 supplies a single pulse (so called ARP, or azimuth reference pulse) each time the antenna rotates through a reference position, e.g., north. Thus, one ARP pulse is supplied by the source 16 for each complete rotation of the antenna 12. The source 16 also supplies for this mode of antenna position communication a series of ACP (azimuth change) pulses as the antenna rotates through its 360° arc. Any number of regularly spaced ACP pulses may be supplied depending upon the desired resolution for the system, e.g., 4096 such pulses, thus angularly quantizing the monitored space into 4096 parts. Alternatively, instantaneous antenna orientation information may be communicated as the output of a synchro coupled to the antenna rotating shaft, as is also commonly employed.

As further radar equipment the apparatus of the FIG. 1 system employs a secondary surveillance beacon radar 14, the radar 14 being coupled for rotation in synchronism with the radar 12. This may most simply be effected by simply mounting the antennas for both radars 12 and 14 on a common drive shaft.

As distinguished from the primary radar 12 which is non-cooperative in the sense of requiring nothing from the aircraft being monitored to generate an information return, the secondary surveillance radar 14 is such a cooperative system. That is, the secondary surveillance radar 14 emits periodic beacon interrogation signals (ATCRBI) which are electronically received and detected by electronic transponder equipment aboard the aircraft being monitored. The aircraft transponder responds to the interrogation signal by emitting a radio signal (ATCRBS) bearing certain specified intelligence which depends upon the format of the interrogation signal supplied by the surveillance radar 14. The mode specifying interrogation signal currently embody pulse position modulation, the intelligence being the time spacing between two emitted interrogation pulses. Depending upon the spacing of such signals, i.e., the mode for that beacon interrogation cycle, the aircraft borne equipment will transmit, in a prescribed format and with a prescribed interdigit spacing, a digital encoding of either the aircraft's altitude (Mode C) or its assigned unique beacon code (i.e., identification number)-Mode 3. The transponded beacon messages each comprise two ($F_1$, $F_2$) framing pulses spaced 20.3 $\mu$sec. and 12 equally spaced data pulse positions therebetween.

Again, as for the case of the primary surveillance radar, the beacon returns generated responsive to the secondary surveillance radar 14 burst through to a narrow (e.g., 4°) area of air space are received at times depending upon the slant ranges from the antenna to the ensemble of aircraft in the interrogated sector. These returns, received consecutively in time (with a possibility of some overlap for nearly equal slant range conditions) are supplied by the radar 14 to the FIG. 1 digital computing apparatus by way of a lead 24 and the communications link 18. Further with respect to such mode information, a replica of the interrogation signals (with the inter-pulse mode intelligence) is supplied via the source 16 to the remainder of the FIG. 1 apparatus via a bus 22 and the link 18.

The ensemble of signals above described are communicated to a data acquisition subsystem (DAS) 100 which provides a number of system functions. As with the remaining subsystems shown in FIG. 1 and commented on here, the DAS is presented in detail hereinbelow, the instant discussion being for purposes of introduction and overview.

Among its major responsibilities, the DAS 100 receives the raw information beacon returns from the radar 14, and operates upon such signals in conjunction with the reference signals supplied thereto via the source 16. The data acquisition subsystem 100 regenerates and verifies the beacon message and computes such fundamental qualities as the range and azimuth characterizing the aircraft transponding each message. The subsystem 100 also performs various administrative type operations such as regenerating received signals; obviating transients; converting synchro antenna orientation data where employed into ARP and ACP signals; batching, assembling and buffering digital messages for transmission to the data processing subsystems (DPS) 300; and providing cathode ray tube display signals which may be used to supplement the video presentations otherwise made, or as a replacement video presentation in case of an operational difficulty. The subsystem 100 includes a beacon reply circuit 165 to detect and process those situations where interfering (i.e., time overlapping) beacon replay signals are encountered. Such a situation may arise, for example, where two aircraft in a sector have approximately the same slant range to the antenna.

The information characterizing each return in the primary video stream is supplied to a data processing subsystem (DPS) 300 which includes in its structure digital computer apparatus. The DPS 300 is assigned varying system responsibilities. As a first and fundamental matter, the subsystem 300 including a first (CPU) memory which includes target scratch pad and main data base tables which characterize each of the aircraft within the air space controlled by the FIG. 1 system. As is apparent, each aircraft encountered in the air space must be continuously monitored. Importantly also in this regard, a measure of the positive radar returns not yet associated with an aircraft must be initially stored to determine when in fact an aircraft has been encountered (scratch pad memory).

As further assigned duties, the DPS 300 stores in a second (DMA) memory and communicates to the system aircraft controller display stations 400 all of the information required create a proper display. Where, as for the assumed arrangement, no local memory is employed at each of the several air traffic controller locations, the structure 300 also periodically (as on an interrupt basis) regenerates and refreshes each display. Further functions performed by the data processing system 400 will become apparent from the detailed description thereof presented in detail hereinbelow.

The automated radar system of the instant invention includes a plurality of displays 500 the displays being generally subdivided into one or more common displays (e.g., a Brite display at a control tower), and a plurality of IFR room displays each associated with an air traffic controller station 400. Also associated with each air traffic controller station is a data entry display subsystem (DEDS) 505 which permits the controller to change the form and content of the presentation at his console. Thus, for example, the air traffic controller may select for display aircraft within a defined bounded altitude zone; may delete aircraft; may communicate with the central processor in DPS 300 to hand off aircraft to a different controller; may add to the alpha-numeric content of the information displayed at his console for any aircraft; may display the full information of another controller; or the like. Moreover, apparatus is employed within the DEDS 505 for the entry of information from the controller to the memory and processor of the DPS 300. To this end, structure permits the controller to signal to the central processing unit the identity of any particular one of the returns being displayed at his console, and alpha-numeric and function keyboards permit the controller to enter information and functional requests with respect to the identified aircraft in the computer. Other functions effected at the air traffic controller station 400 will become more clear from the detailed presentation below.

The general form of the video display at an air traffic controller station 400, presented at the face 410 of a cathode ray tube there located, is shown in FIG. 2. It will be presumed that the terminal area monitored by the FIG. 1 system is divided into an arrival controller (possibly one of several) at the particular console 410 of FIG. 2, and a departure controller. As a general (but not necessary) status of the display, all of the ASR primary radar video returns (signalled by a spot on the tube) from incoming aircraft associated with the subject controller are marked with the letter "A" to signify the arrival controller. With respect to the particular display for an aircraft presented within the dashed area 412 in FIG. 2, the instantaneous aircraft position is depicted by the spot 411; its path is shown by the trail 409 of decreasing light intensity; and the capital letter "A" 413 signifies that the return is associated with the arrival controller.

Further included in the full data block display 412 is a leader 414, at the end of which is a two row alpha-numeric presentation. The upper row contains aircraft identification. For a scheduled airline, this comprises a first field 415 which denotes the airline (e.g., such as "AA" for American) followed by a field 416 which corresponds to the flight number. The second row of alpha-numeric information includes a field 413 which presents the altitude of the aircraft in hundreds of feet, and a further field 418 (blank in the display of 412) which depicts special descriptors. The field 418 shown with the designation "OLD" at 422 is an illustration of such a completed field 418. The OLD designation signifies that no return was received at the radar for the most recent interrogation cycle or cycles, and thus the controller is advised that the entry comprises old data. The return may be lost, for example, during maneuvers when the air frame masks the transponder antenna. Other special descriptors may comprise "???" when the same beacon code is transponded by two aircraft, "HND" during controller aircraft hand off events; and the like.

The display of FIG. 2 may also include one or more markers, e.g., the double slash 425. In the manner discussed below, an aircraft controller can mark any desired aircraft on his presentation with a special flag to facilitate his tracking of that aircraft.

A plurality of aircraft indications in the FIG. 2 display bear the designation "D" (e.g., the display element 420). These are associated aircraft handled by the departure controller and therefore do not have a full display block. Should it become desirable or necessary that the arrival controller obtain any information with respect to any departing aircraft, he may do so by identifying that aircraft with the data entry subsystem 505 at his station, and signal via a function key a request that the full data block display is desired.

Indeed, in hand-off situations (as for an aircraft passing from an east to west controller; or for a departing aircraft returning for landing), the designation field 413 will change, and the full data block presented, as from "D" to "A" for the situation schematically depicted in FIG. 2.

We make here some further observations with respect to varying display presentations of FIG. 2—which is intended to be illustrative rather than a complete enumeration of all possible display configurations. First, a plurality of alphanumeric data fields may typically be presented. Thus, for example, a tubular area 423 may comprise data which indicates flights, i.e., aircraft, expected into the controller's zone shortly, or aircraft which have become inactive and are leaving the zone. Further areas may be employed as desired. For example, a display portion 429 may be employed to present the limits of the display being generated at the console station—for example, an altitude range comprising an upper bound 430 (e.g., 15,000 feet for the assumed situation) and a lower bound 431 (assumed to be 1,000 feet). A further data area may display such parameters as time, altimeter setting, current field barametric reading; next available beacon code; messages being generated at the console station for transmittal to the system data processing subsystem 300; or the like.

Several descriptors other than those considered above may be presented in the alpha-numeric information field for any aircraft. In the case of general aviation, a presentation 427 may display a tail number rather than an airline and flight identification; a raw beacon code may be presented as for the display portion 421; an emergency code displayed for a transponder set to signal an emergency situation. By international convention, specific alarm codes have been assigned for radio communications failure (76 or 7600); mechanical difficulties (77 or 7700); or a highjacking (31 or 3100).

Still further, selective one or ones of the display items may be marked with a "flag", e.g., a double slash 425 shown in FIG. 2. This permits the controller to more readily keep visual track of selected aircraft for what may be some especially appropriate purposes.

Displays for the instant automated radar terminal system are of two basic forms as above stated. First, a presentation as in FIG. 2 is made at each air traffic controller station 400, typically located in the IFR (ACC) room, which has a relatively low ambient illumination. A second, Brite display will typically be presented in the control tower. The Brite display is formed employing two cathode ray tubes, one driven with the primary radar return signal ensemble (thereby generating the trail 409 and present position 411 of the display portion 412 of FIG. 2). The other tube is supplied with the alpha-numeric information of the FIG. 2 display.

The cathode ray tube presenting the primary radar return is scanned with a high persistence television camera tube (e.g., vidicon), thereby generating an output television signal with sufficient persistence to contain the trail 409 information which embodies the presentation of the direction of motion of the subject aircraft. Correspondingly, the alpha-numeric display cathode ray tube is scanned with a television camera characterized by a low persistence such that the alpha-numeric information does not blur as its position shifts with aircraft motion. The two signals from the two television cameras are then linearly combined as in a video mixer, and employed to drive a further cathode ray tube in a conventional manner.

It is observed here as well that the FIG. 2 presentation for an IFR controller display contains the same two basic kinds of information as the Brite display, viz., primary radar return information, and system generated alpha-numerics. Each is generated on the face 410 of the controller display console at different times. That is, a conventional ramp type radar pulse position indicating (PPI) sweep is generated, comprising repetitive ramp deflection signals.

Interleaved between spaced, consequetive ones of such saw tooth pulses during the radar dear time are intervals where the alpha-numeric information is created on the tube screen, each alpha-numeric presentation being refreshed at a sufficient rate so that no flicker is observable.

With the above general overview in mind of the functional elements in the FIG. 1 composite automated radar terminal system, and of the end controller presentations forming the output of the system, the individual elements thereof will now be examined in detail.

Referring first to the data acquisition subsystem 100 shown in FIG. 3, there is shown a receiver quantizer 104 for receiving certain of the antenna site generated signals. In particular, such signals comprise a single range trigger pulse generated once during each radar period, at a known and fixed time with respect to the signals emitted by the primary and secondary surveillance radars 12 and 14. The quantizer 104 receives the mode trigger signal on a lead 102 which, by the time spacing between the two pulses thereof, signals whether the beacon system is operating in a mode 3 (aircraft identifying code) or mode C (transponder-reported altitude) manner. Finally, on a lead 101 the element 104 receives the beacon return ATCRBS video signal stream detected at the secondary radar 14.

It will be appreciated that each of the signals above discussed may be supplied on a separate lead 101–103 as shown in FIG. 3, or they may be supplied to the quantizer 104 for separation via a single communication path. The signals appear at mutually distinct times in a fixed and predetermined order; that is, the range trigger pulse occurs first to signal initiation of a new interrogation signal cycle, the two mode trigger pulses are next received to indicate the interrogation format of the beacon radar 14; and this is followed in time by the full ensemble of return signals generated by the aircraft transponders which respond to the beacon interrogation, the time and occurrence of these latter signals depending upon the slant range of the several aircraft in the active air space sector to the radar antenna. Thus, the signals may be separated by sequential gating structure well known to those skilled in the art. Moreover, as is well known, a defruiter may be employed to reject spurious transponder replies.

Examining first the range trigger pulse supplied on the lead 103, the receiver-quantizer 104 terminates the communications link, and detects and regenerates this signal (eliminating all transients, noise and the like), and supplies the range trigger via an output lead 121 to enable a gate 135. The enabled gate 135 passes the fixed contents of a register 133 to the preset inputs of a range counter 132 to preset the counter. The contents of the register 133 (and thereby also the initial state of the range counter 132) are set to a value dependent upon the time relationship between generation of the range trigger pulse, and emission of the radar interrogation pulses (system electronic delays also being taken into account). This is effected since, as will become more clear from the immediately following discussion, the contents of the range counter 132 directly correspond to information which characterizes the distance of each subject aircraft "target" from the control site, assumed herein without limitation to be an airport terminal area.

The range counter 132 is advanced by the output of a range oscillator 130 which supplies thereto an output sequence of regularly spaced pulses 131. The spacing 134 between consecutive pulses (i.e., the repetition rate of the oscillator 130) is adjusted in accordance with the slant range distance to be represented by each pulse. This may correspond to some convenient engineering unit, or may be a non-engineering or arbitrary distance which is converted during data processing into desired range units.

It will thus be appreciated from the foregoing that the range counter 132 is initialized at the beginning of a radar interrogation cycle, and presents at a bus 164 connected to its output a monotonically increasing value which characterizes aircraft distance away from the radar antenna. Thus, when any radar return is noted, a coincident examination of the output of the range counter 132 will supply information yielding the distance of the aircraft generating that return from the system antenna equipment. Finally, it is observed that the range trigger pulse on lead 121 is employed to synchronize the range oscillator 130 such that the oscillator begins from the same known state beacon transmit/receive cycle.

Turning now to azimuth information, it is obviously necessary to generate information which characterizes the angular spatial relationship between the radar antennae and each target. The azimuth related structure shown inn FIG. 3 generates information which characterizes the instantaneous antenna orientation. However, as more fully discussed below, such azimuth information is not sufficient to locate an aircraft since the aircraft will generate position returns during a number of successive radar antenna interrogation bursts as the antenna sweeps through its 360° path. Thus, the azimuth information generated by FIG. 3 will be further processed in the manner to be discussed with respect to the data processing system 300 to definitively locate each aircarft.

As above noted, azimuth information characterizing the instantaneous orientation of the emitting antenna is supplied in either of two forms. Most conveniently from a conceptual standpoint, the information is supplied in digital form and identically corresponds to the azimuth reference pulse (ARP) and azimuth change pulses (ACP). Again, it will be recalled that the ARP is generated once per scan as the antenna rotates through a reference position, while plural ACP pulses for each RP pulse subdivide the 360 spatial degrees into plural equal parts. Where such ACP and ARP pulses are directly supplied, they are present at leads 110 and coupled to system ARP and ACP leads 115 and 114 via a selector switch 113 which may comprise, for example, a simple double-pole, double-throw switch. Alternatively, the intelligence indicating the instantaneous spatial orientation of the radar shaft and antennas may comprise the output of synchro apparatus. Such inputs, present at input bus 105 are converted to ARP and ACP form at leads 112 in an azimuth data converter 107, embodiments of which are well known and commercially available. The signals on the leads 112 may again couple to the leads 114, 115 via the switch 113.

The ARP and ACP pulses are processed in a manner above described with respect to the range pulse and output of the range oscillator 130, the object being to present at the output of an azimuth counter 124 a monotonically increasing value to denote increasing antenna azimuth from the reference position. To this end, the ARP pulse on lead 115 opens a gate 122 for presetting azimuth counter 124 with the fixed contents of register 121. The fixed contents of the register 121 account for system delays, and translate the reference position corresponding to generation of the ARP pulse to the spatial reference position desired for the composite FIG. 1 system.

The azimuth information present at the output of the azimuth counter 124 is converted to serial form by parallel-to-serial converter 126 and passes via a lead 150 and a multiplexer 153 (e.g., simply disjunctive logic) into a DAS buffer shift register 154. The register 154 with its associated logic supplies at the plural output stages thereof information in parallel form via a bus 160 to the data processing subsystem 100 for data processing, also supplying to the equipment 300 a service request interrupt signal via a lead 161 when the register 154 is loaded and has information to transmit.

The mode information present at the lead 102 is regenerated by the quantizer 104 and supplied via an output lead 122 to a mode decoder 140. Again as above described and as shown in the wave form 146 of FIG. 3, this mode signal comprises two spaced pulses, wherein the spacing 148 comprises the mode 3 via-a-vis mode C intelligence. The mode decoder 140 loads two stages of the register 154 with signals via a bus 158 to signify whether the secondary surveillance radar 14 is operating in a beacon code or altitude mode, it generating this information at output leads 142 and 144. Various embodiments of the mode decoder 140 will be readily apparent to those skilled in the art—most simply two differently timed delay circuits which generate mutually distinct, time spaced windows fixed periods after the incidence of the first of the two mode pulses, selectively setting associated flip-flops or the like depending upon whether or not the second pulse occurs in the mode 3 or mode C time slot.

The quantizer 104 operates on the reply beacon video bit stream present at the lead 101 by regenerating the bit stream, and by strobing and synchronizing the received information with a high speed beacon clock such that the pattern of binary 1's or 0's in the received video beacon stream are synchronized with the beacon clock. This may physically occur as well in the beacon reply circuit 165 discussed below. Most simply conceptually, such strobing may be effected by operating on the beacon information from the secondary surveillance radar 14 with edge triggered flip-flop type logic. As previously observed, the beacon code transmitted by an aircraft responsive to a beacon interrogation (ATCRBI) signal from the secondary radar comprises bracketing $F_1$, $F_2$ (start, stop) pulses, and a prescribed plurality (e.g., twelve) information bearing digits (pulses or absence of pulses) therebetween. Sometimes as well, responsive to a request from an air traffic controller, the beacon reply will contain a further (SPI) squawk identification pulse following the stop pulse. An aircraft controller would request such an SPI pulse, for example, if two aircraft were erroneously emitting or appearing to emit the same beacon identification code.

The beacon digit stream is supplied from the quantizer 104 and a lead 162 to a beacon reply circuit 165 more fully discussed below. The beacon reply circuit operates on the incoming beacon video stream by extracting from the beacon clock synchronized beacon return a proper sequence of beacon message digits, also accounting for the cases where overlapping, possibly inextricably merged returns were being received at the beacon antenna—as may happen where two (or more) aircraft have approximately the same slant range with respect to the beacon antenna. The finally processed beacon return (comprising either a beacon identification code or altitude depending on mode) is coupled from the beacon supply circuit via a lead 168 to the buffer register 154 for communication to the DPS 300.

The beacon identification code is also supplied via the circuit 165 to analog decoder circuitry 170 for purposes of creating any supplementary display desired for the cathode ray tube presentation, e.g., flags such as the double slash 425 shown in FIG. 2. Thus, by way of brief overview, a beacon code (really a number of beacon codes) and the fixed codes of emergency conditions are loaded into separate registers of the decoder 170. When the beacon response being processed by the system and coupled to the decoder 170 from the circuitry 165 via lead 174 corresponds to any of these stored codes, an appropriate analog flag wave form is generated by circuitry 170. The flag is supplied by the lead 176 as supplementary video information to a linear summing network 178 (located in the DAS 100 or at the display positions) where it is combined with the primary surveillance radar return present on lead 180. This generates the desired flag on the display, such as the double slash 425 of FIG. 2. The output of the summing network 178, of course, comprises Z axis or intensity modulation for the cathode ray tube at the display location. The analog decoder circuitry 170 is more fully set forth in FIG. 5, and the discussion herein relating thereto.

Turning now to FIG. 4, there is schematically shown the structure of the beacon reply circuit 165 of FIG. 3. It will be recalled that the beacon message is of a prescribed format, and always comprises stop and start pulses a fixed distance apart (e.g., for the assumed, existing format 20.3$\mu$ sec corresponding to 13 times the inner digit bit spacing). It will also be appreciated that the beacon messages are received on an asynchronous basis, depending upon the instantaneous slant range distribution of the aircraft relative to the secondary surveillance radar 14. Accordingly, it must first be determined when a beacon message has been received. Moreover, the situations when unrecoverable beacon messages are being processed must be determined—such as a dead overlap of two slant range returns which cannot be processed since each information digit is merely the logical OR function of the individual messages. There are further situations where messages overlap, but where sufficient information exists to permit separation and use of the separate messages.

To detect an incoming message from the secondary surveillance radar, the message synchronized with the beacon clock present on lead 162 is supplied to a shift register 182, and also supplied as a direct input to an AND gate 183. A tap is taken from the shift register 182, the delay between the input to register 182 and the tap thereof being essentially equivalent to the nominal time between the bracket pulses of the beacon message.

When a beacon message is thus encountered, the shift register 182 supplies to the AND gate 183 a delayed replica of the start bit while the line 162 directly conveys to the AND gate 183 the stop bit. Thus, for such (normal) case the gate 183 is fully enabled and produces an output pulse which passes through an OR gate 186 to produce a signal at the output thereof which in essence conveys the intelligence that a bracket (most often indicating a proper beacon message) has been received. Responsive to the bracket information, a gate 192 is enabled, passing the instantaneous state of the range counter 132 conveyed via the bus 165 to parallel load a range storing shift register 194. Thus, the register 194 is loaded with the range of the target for which the bracket is received.

To accommodate the situation where there may be some small disparity between the actual and normal period for the start-stop pulse interval, one or more outputs of the shift register 182 may be acted upon by disjunctive logic in conjunction with the non-delayed beacon signal present on the lead 162. Thus, a number of additional shift register output stages may be combined with OR logic (only one being shown) and passed through an AND gate 184 together with the signal from lead 162 to create a bracket signal via the output of the OR gate 186. The beacon message digits (again, strobed and increased in number) are supplied via a lead 204 to a first input of a coincidence gate 203. When a bracket is detected, the bracket signal at the output of the gate 186 sets a flip-flop 200 which partially enables the gate 203 for the duration of the beacon message cycle. It is observed that the flip-flop 200 and gate 203 are associated with a first processor 190, there being two such processors 190 and 218 in the composite beacon reply circuit 165. Two processors 190 and 218 are utilized to permit the circuit 165 to process two messages overlapped in time.

Returning to the main line processing discussed in conjunction with the processor 190, the bracket pulse also enables a counter 210 which is cycled by the beacon clock with which the pulses on the lead 204 are synchronized. Upon each cyclic overflow of the modulo n counter 201, a pulse is generated to to strobe the data signal present on the lead 204 onto the output of the enabled gate 203. The modulus of the counter 201 is scaled to present the proper (e.g., twelve) number of strobes corresponding to the digit positions of the original beacon message. Thus, the circuitry immediately above described reduces the repetition rate of the beacon pulses to recreate the stop, start and data bits actually transmitted by the subject aircraft.

The beacon message information is shifted into a shift register 205; translated by a combinatorial data translator 199 dependent upon whether the equipment is operated in mode C or mode 3 (these signals being obtainable from the azimuth range and timing circuit above discussed in conjunction with FIG. 3). The translation is to comply with Federal Aviation Authority regulations rather than any technical necessity. Finally, the message (beacon code or altitude) is loaded in parallel into a shift register 195, and the composite message comprising the beacon message of shift register 195 and the range stored in the range shift register 194 cascaded with the register 195, shifted out for delivery to the buffer 154 of FIG. 3. The contents then flow therefrom to the central processor.

As above noted, the beacon reply circuit 165 includes two processors 190 and 218 to simultaneously process two overlapped incoming beacon reply messages. The No. 1 processor 190 is normally employed in the manner above noted, and an AND gate 216 enables a flip-flop corresponding to the element 200, but in the processor 218, when the processor 190 is busy (as signalled by a set flip flop 200) and a further bracket signal is generated at the output of OR gate 186.

It will be appreciated that for the normal situation, the beacon messages are non-interfering, and are separately received ad seriatim. They are simply processed in the manner above described with respect to the processor 190. Where two return messages occur in part simultaneously in time, the digits thereof may be interleaved. To this end, the synchronization provided by the bracket signal for each of the two messages permits each to be received simultaneously and independently, one being processed in the manner described above by each of the processors 190 and 218, there being no time coincidence between the actual digits of the two messages.

As a final possibility, the situation may occur where digits of two messages are overlapping in time, and where there is (or may be) actual time interference between the digits thereof. Such conditions are treated by garbled message circuitry 219 of FIG. 4. The circuitry 219 is enclosed within an open ended dashed area, additional parallel structure being provided to monitor the second processor 218.

As a first condition treated by the garbled message detector 219, an AND gate 220 is supplied with the data strobe outputs of the counters 201 in each of the processors 190 and 218. The gate 220 is supplied as a further input with the incoming data message level. If the AND gate 220 is ever fully enabled, this signals a condition where both processors 190 and 218 are simultaneously examining the same data bit which, moreover, is of a high level. As noted above, where digits of two messages occur coincident in time, the radar receiver and the pulse generating circuits above described produce a logic OR wave integration of the two beacon messages. Thus, there is no way of telling whether the high level transmission being examined occurred in a particular one or in both of the transmitted messages and, accordingly, neither message can be received with assurance. Thus, gate 220 sets a flip flop 221 having its output pass through an OR gate 226 to set a garbled flag bit 227 in the shift register 195. The processor ignores data which includes a set garbled bit.

Further, the remaining structure shown in the detector 219 accommodates a like kind of situation; but one where the information may or may not be separately recoverable. This corresponds to a situation where a bracket digit pulse is observed at the same time as a modulo strobe pulse is produced at the output of counter 201, as signalled by an AND gate 222. This output provisionally sets flip flops 228 and 229. The output of the flip flop 229 comprises "possible garbled-hold information" intelligence, this signal blocking the normal functioning of the processor 190 by disabling an ANd gate 210 necessary for output sequencing thereof.

Unless the flip flops 228 and 229 are cleared by a delay circuit 230 and gates 224 and 225 within a proper time frame which identify the two interfering messages as in fact occurring sequentially spaced by one message interval, the provisional garbled flag will be made final.

Finally, for completeness, it is observed that a flip flop 208, the AND gate 210 and shift register stages 212 and 213 are connected to the output of shift register 205 which has shifted therethrough the beacon messages originally broadcasted by an aircraft. These elements are employed to generate sequential operation signalling pulses. For example, the output of the shift register stage 212 loads (gates) information into the shift register 195, while the output of the final shift register stage 213 selectively present at a lead 214 generates a clear signal which clears all of the storage elements (e.g., flip flops) of the processor. The flip flop 208 is employed for delay purposes, and the gate 210 for reasons above stated to prevent output sequencing where possibly garbled data is being detected.

Referring now to FIG. 5, there is shown in detail the analog decoder circuitry 170 discussed above with respect to the data acquisition subsystem 100 of FIG. 3. The analog decoder 170 receives the beacon identification code from the beacon reply circuit 165 via lead 197, this being delayed and converted to parallel form in shift registers 240 and 243, and an intermediate lead 241 therebetween.

The decoder circuitry 170 includes a plurality of registers $246_i$. A subset of the registers 246 are associated with aircraft identification codes, and may be loaded with differing codes, e.g., by supervisory personnel. The remaining registers 246, e.g., the register $246_n$ store one of the predefined emergency codes, there being one register 246 for each emergency condition. Each register $246_i$, and the outputs of the shift register 243, are supplied to an associated one of a plurality of digit comparators $245_i$. Each comparator $245_i$ will thus provide an output when and only when the contents of the shift register 243 (the beacon code) identically correspond with the contents of the register $246_i$ associated therewith. Thus, for example, the comparator $245_i$ will impress an output on lead 248 when the aircraft whose beacon and return is being processed corresponds to the code stored in the register $246_i$ (herein: Code 1).

The purpose of the decoder circuit 170 herein considered is to automatically generate flags which a controller may select for appearance on a display to designate aircraft of particular interest. The controllers may select for each of their specifically designated targets (i.e., those whose codes appear in the registers 246) any of the flag foremats, e.g., single slash, double slash, of the type shown in FIG. 2, bloomer, and so forth.

Thus, at the display station there is a selector switch 250 which may be connected to a terminal 251 to select a single slash for Code 1 detection; a terminal 253 to select some other marker (e.g., a double slash); a terminal 254 to select a bloomer, and so forth.

Similarly, the controller has a plurality of switches comparable to the switch 250 such that he may designate a particular flag for any other of the designated aircraft beacon codes. Flags for the emergency conditions will typically be standardized.

The primary radar video display considered hereinabove, with respect to FIG. 2 is of the PPI type, developing outward radial beam tracings which sweep around the face of the cathode ray tube. Thus, a single slash (arc) display is created via a wave source 271 which generates at its outut a single pulse 281.

The pulse 281 turns on the CRT beam for a portion of its radial length (about the position of the same target reported by the primary radar return). Further, the slash will appear as a circular arc since the aircraft beacon code will be encountered for each of plural consecutive secondary radar bursts and pulses 281 will appear at the same portion of CRT beam radial length since the beacon antenna rotates through a range of orientations where its emitted beam is received by the aircraft.

The desired flag is selected by matrix-like gating circuitry between the leads 248; and the instantaneous settings of the selector switch 250, . . ., 255. Thus, assuming the lead 248 to be energized, only one of the gates 260, . . ., 265 connected thereto will be fully switched, depending upon the position of the switch 250. For the position of the switch 250 shown in the drawing, the gate 260 is fully switched and sets a flip flop 270 in the single slash wave source 271 acting through an OR gate 263. The wave source 271 operates by cycling a counter 276 actuated by the range clock 273 acting as an oscillation source. The oscillation pulses are passed to the counter 276 by a gate 274, which is partially enabled by set flip flops 270. A decoder 278 is connected to the outputs of the counter 276 stage, OR logic 280 being employed to generate the desired wave form by simply receiving connections from a sufficient number of decoded counter states. After completion of the pulse 281, the decoder 278 resets the flip flop. Thus a pulse pattern of any desired description may be found by simply connecting the proper ones of the decoder 278 outputs to the OR gate 280. For example, the bloomer source 286 includes a plurality of consecutive counter states, while a double slash may be formed by deleting as input connections to the OR gate 280 decoder outputs corresponding to intermediate counter states.

The flags produced at the outputs of an operative one of the flag sources pass through an OR gate 284 to the summing network 178 whhere it is combining with the primary radar signal. Implicit in the situation, such flags are automatically generated at about the same time that the primary radar return is being processed, and thus appears on the face of the cathode ray tube display in close proximity therewith. A variable resistance 179 (or as the equivalent thereof a variable gain amplifier) may be utilized to vary the relative intensity of the flags vis-a-vis, the primary radar return.

Turning now to the data processing subsystem (DPS) 300 shown in the system block diagram of FIG. 1 (the DPS 300 being depicted in FIG. 6) there is included a central processor 310 having connected thereto a CPU memory 312. The computing equipment may comprise any well-known structure therefor, one especially effective embodiment being the MAC 16 minicomputer available from the Lockheed Electronics Corporation, which has a plurality of interrupt ports 314. The central processor 310 further bilaterally communicates via a bus 320 with a DMA memory 325. Also connected to the bus 320 is direct memory access circuitry 322, which includes selector data channel multiplexing structure 323. Connected as one input to the direct memory access 322 is the bus 160 from the buffer register 154 of the data acquisition subsystem 100 (FIG. 3). The direct memory access 322 supplies as output signals via output busses 327 information to the several display 500 for purposes of loading and refreshing each of those displays.

The data processing organization of FIG. 6, in keeping with the MAC 16 and other selected stored program computers, provides for direct, high speed bilateral communications between the DMA memory 325 and the input and outputs connected to the direct memory access 322, without requiring central processor 310 involvement or supervision. Thus, display refreshing, and communications with the DAS 100, may be effected while the processor 310 is involved with other system assignments.

Additional information can be supplied to the central processor 310, and therefrom to either memories 312 or 325 associated therewith, at a lower rate of speed, via a multiplexer 306. Thus, long distance communications, as from enroute control centers or the like, may be supplied to the processor 310 via a modem 302. Such information may comprise, for example, anticipated arrival times and beacon codes for aircraft in route. Like information can be read into the processor 310 via the multiplexer 306 from a peripheral store 304, e.g., a tape or disc unit which includes the traffic patterns of regularity scheduled aircraft. Such information is employed to correlate beacon codes with aircraft identification.

As further inputs to the central processor 310 through the multiplexer 306, there are included the data entry display subsystems (DEDS) 505 each associated with a different one of the air traffic controller stations. As noted above, each DEDS 500 includes a position entering module (PEM) 502 which is employed to control a light spot appearing on the face of the controller's cathode ray tube display. The PEM 502 may comprise any of the multicoordinate transducers well known to those skilled in the art, e.g., so called joy stick arrangements. The electrical outputs of the PEM 502, comprising differential or absolute information depending upon the type of transducer employed, are communicated to the central processor 310 via a bus 506 and a multiplexer 508 in each DEDS 505, and the multiplexer 306.

Each DEDS 505 further includes an alphabet key field, a numerical key field, and control and switch key fields. Activation of any key produces an encoded electrical output thereof which is similarly communicated to the processor 310 via the multiplexers 508 and 306. To illustrate typical operations of the DEDS equipment, an air traffic controller may operate the joy stick 502 to place his display marker in the vicinity of one CRT display return, operate a control (e.g., "enter") key to identify the aircraft to the processor 310, and then depress control key(s) corresponding to the display modification(s) desired. Thus, for example, the controller may wish to obtain or delete a full data block for any display element; to view the pattern available to another controller; to change some portion of a full data block or the vector orientation thereof; to change the altitude limits or otherwise filter the display present on his console; and so forth.

As above noted, the plurality of interrupts 314 are employed in conjunction with the central processor 310. Thus, for example, an interrupt lead 316 from the DAS 100 signals the central processor 310 when the DAS has information to transmit to the processor (i.e., when the buffer 154 thereof is loaded). A second, plurality of interrupts 317 are respectively associated with the several system displays 500, and provide an interrupt signal when the display requires refreshing, e.g., some minimum time, after the last display information was transmitted thereto. Similarly in the manner well known to those skilled in the art, a further plurality 318 of interrupts are associated with the various system peripherals which require servicing, e.g., the DEDS 500, modem 302, peripheral store 304, and so forth.

The particular organization of the CPU and DMA memories 312 and 325 with respect to data processing in accordance with the present invention, and the operation of the central processor 310 in conjunction therewith, will become clear from the discussion set forth hereinbelow.

As a final major structural combination of the FIG. 1 system, an illustrative display 500 is depicted in FIG. 7. The display includes input bus 327 from the data processing subsystem 300 (and more specifically from the direct memory access-selector data channel 322 thereof) for supplying thereto a complete display message. The message format, in brief, consists of one A word which comprises status and type of display (e.g., full data block, limited data block, leader type, controller letter designation, and the like); followed by two B message words ($B_1$, $B_2$) respectively providing the X and Y coordinates for the alpha-numeric display; in turn followed by four additional C message words which bear the specific alpha-numeric information. Structure of the FIG. 7 type is commercially available, e.g., the RAD system is manufactured by the International Telegraph and Telephone Co., Ft. Wayne, Indiana. Accordingly, the display 500 of FIG. 7 will be treated here only briefly.

The input words are received at a buffer and format generator 520 which supplies the position information to register and digital analog converter apparatus 528. Information from the A word defining the desired data block leader is supplied to a leader generator 526, and the alpha-numeric characters are identified to, and generated by a generator therefor 524.

By way of overview, a conventional PPI sweep is generated by a sweep generator 530 which responds to the ARP and ACP pulses by generating a triangular output wave form. This may be done, for example, by treating the ARP as a clear pulse and integrating the ACP pulses. During the active primary radar return intervals, the sweep generator output passes through a switch 531 to a deflection amplifier 532 for energizing a gross deflection coil 535 to generate the PPI sweep. During such intervals also, the primary radar video (supplemented by any flags as above described) passes through the switch 531 and intensity modulates the display cathode ray beam to generate the PPI display at the face 410 of the cathode ray tube 538.

In the interval between active radar scans, alpha-numeric information is painted on the face of the cathode ray tube as above stated. During such intervals the switch 531 energizes the defection amplifier 532 from the element 528 to position the beam in accordance with the position desired for each respective alpha-numeric character (and leader). To develop each character, first outputs from the alpha-numeric generator 524 and leader generator 526 operate through the switch 531 to modulate the intensity of the cathode ray beam in accordance with the leader or character being developed, while second (deflection) outputs from the generators 524 and 526 signal a writing amplifier 536 for providing relatively small character tracing deflection perturbations about the gross deflection position defined by the output of the amplifier 532. Thus, it will be appreciated that a character (or a leader) is generated by directing the beam to the general area of a display field (coil 535); and then slightly shifting the beam position while intensity modulating the beam to develop each of the characters in turn (Z axis modulation, and the coil 533).

Accordingly, the above discussion has depicted and described in detail the structure of the composite FIG. 1 automated radar terminal system, and the functioning of that equipment.

We turn now to descriptions of storage allocation and data processing for the FIG. 1 structure to yet further characteristic operation thereof. Referring in particular to FIG. 8, there is shown a portion of the central processor memory 312 and a portion of the DMA memory 325. As a first subject of discussion, the central processor memory 312 includes a main data base 329 comprising a plurality of groups of storage cells which contain information characterizing each target (i.e., aircraft) being monitored by the system. The number of available target storage blocks in the main data base 329 is a matter of scale and system capacity desired.

There is shown in detail within the main data base 329 in FIG. 8 one full data block comprising first and second portions, this being illustrative of the plural other such data blocks. The first or upper portion of the full data block comprises storage cells 330–335, the second storage grouping for the same target comprising plural (e.g., four) cells 340 and cells 342–343. The first memory address 330 stores a pointer to the memory address of the second storage block portion, i.e., the address of the first storage cell in the storage group 340. The second address 331 stores a pointer to the next aircraft storage block in a related "string", that term being more fully described below in conjunction with the hash list store 350. The third cell 332 includes a pointer (address) to the beginning address of display storage for the subject aircraft in the DMA memory 325. The following cells 333 and 334 contain the latest computed X and Y coordinates for the aircraft, in range coordinates, while the final cell stores the aircraft beacon code.

The four storage cells 340 contain the C words described above for creation of a full display, i.e., the airline flight number and the like, cell 342 stores the aircraft altitude; while the final address 343 includes various administrative and status bits, including a marker bit to assure that the data block has been updated on the radar scan (if not, the OLD field is created).

The above described data base entry corresponds to storage for an aircraft identified with full alpha-numeric information as above noted. Where lesser information is available, i.e., for a general aviation aircraft without a beacon transponder, the second portion of the storage is simply not employed, there being no pointer thereto in the address 330. The status information is then kept in the upper six cells 330–335.

All additional aircraft within the range of the FIG. 1 system similarly have corresponding entries in the main data base 329 along the lines above discussed.

For convenience of storage and access, the aircraft are subdivided into associated groups or strings on a quite arbitrary basis (the strings work most efficiently if they are of approximately equal size). For purposes which will be more clear after a consideration of the discussion below, this kind of organization facilitates processor 310 access to the storage block for any aircraft in the main data base. One advantageous way of implementing the above is to employ a hash list store 350 (as in the CPU memory 312) which includes $n$ cells to divide the total ensemble of aircraft in the air space being monitored by the subject automated system into $n$ groups, or strings. This may be effected, for example, by selecting $n$ bits in arbitrary digit positions of the aircraft beacon code, and arranging those aircraft having like digits into strings, or associated groups. For further convenience of processing, it is preferable to arrange the aircraft in any string by increasing beacon code. Accordingly the "pointer to next entry in string" of the storage cell 331 of each data block contains the address of the data block associated with the aircraft in the common string which has the next largest sequential beacon code than the subject storage block. The first storage block in a string simply includes a character to reflect this fact.

Importantly, as aircraft enter and leave the monitored air space, the main data base blocks are reorganized by simple pointer redefinition. There is no costly drain on processor time to physically rearrange the storage blocks.

The above discussion has thus described the format of the main data base 329, and the manner information characterizing each aircraft in the data base is included therein. It will be apparent from the foregoing that display information must be created with respect to each aircraft to define the alpha-numeric portion of the visual presentations effected at the display portions 400, as to position and content. To this end, and as a general matter, the DMA memory 325 contains all display information and has a section allocated to each of the aircraft control console stations 400. Thus, for example, the storage allocated to the first controller is denoted 360 in FIG. 8; that for the second controller being denoted 362 and so on, the allocation for the final controller denoted as 374. The display storage allocated to each controller is shown as being of different sizes in FIG. 8 for purposes of graphic convenience only, and this will not generally be the case.

Display storage within the area assigned to any controller, e.g., the space 360 associated with the first controller, comprises a first portion associated with storage of full data block displays for the console (the upper portion of storage 360); a second portion associated with storage of single symbol entries, i.e., those not having the full alpha-numeric data at the particular controller's position; and a final area for storage of tabular data and the like. For storage allocation purposes, the address of the next available block for the full display is stored in a central processor memory cell 347 and the next address for single symbol storage is contained in a memory cell 349. It is observed in the format of FIG. 8 that full data block storage proceeds downward in the DMA memory 345 (e.g., numerically increasing address) while single cell storage proceeds upwardly (decreasing memory address).

As a specific example of full data block storage for the controller storage 360, and corresponding to the aircraft data illustrated in the main data base 329 of FIG. 8, there is shown a plural cell full data block 352 associated with that aircraft comprising a first cell 353 loaded with a pointer to the aircraft appearance in the table of the next (here second) controller. This is followed by multicell storage of the full information to form the display element, i.e., the words A, B1, B2, and C1-C4 discussed above. Thus, the storage cells 353-354 comprise the full information to generate a complete full field alpha-numeric display such as that shown in the dashed bound 412 of FIG. 2.

Digressing for a moment, it will be recalled from FIG. 2, and the discussion with respect thereto, that, in general, an aircraft will be displayed at a plurality, and possibly at all of the controller stations 400. Thus, for example, a departing aircraft presentation 420 shown simply with the letter "D" in FIG. 2 is most often not accompanied by the full alpha-numeric data block at the arriving aircraft controller station which doesn't have responsibility therefor. However, at the departing controller station, the full data block will be presented. However, and correspondingly, the data block fields 415-418 and the cursor 414 shown in the area 412 at the arrival controller console will be deleted at the console of the departure controller. Thus, the same aircraft will appear as a general matter in the storage allocated to a number of controllers, but will be stored in different portions (full data; single symbol) thereof. Thus, assuming that the aircraft fully identified in the main data base 329 of FIG. 8 is associated with the first controller allocated storage 360, the display information therefor is contained in the full data block 352 in storage 360, while it is contained in the single storage area of storage assigned to the other controller(s). To this end, the pointer in the first address 353 of the data block 352 points to (i.e., stores the address of) the leading cell in single storage 365 associated with the storage 366 for the second controller, there being sequential pointers to connect all storage of the aircraft shown in the main data base 329 in FIG. 8.

The contents of the pointer storage cell in the single cell storage of the final console storage allocation contains a pointer address back to the address 330 in the CPU memory 312. Accordingly, it will be readily appreciated that data process in accordance with the instant invention may be readily accomplished, comprising writing and updating the main data base 329, and updating the display information corresponding to each aircraft identified in the main data base by following the pointer sequence from the CPU memory 312 to each of the DMA memories 325 storage areas containing information with respect to that aircraft until a pointer returns to the CPU memory (or other exit location) is encountered. Thereafter, the computer passes on to the next aircraft in the main data base to again follow its pointer chain through the DMA memory, and so forth.

As a final matter with respect to display storage, the DMA memory 325 includes a common overflow storage area 377, for storing additional display information for any controller when his initially assigned area is full. For purposes of convenience, and while not necessary, this storage can proceed exclusively on a single symbol basis comprising a pointer for the next storage address (either in the main area assigned to the next controller or another address of overflow storage), followed by plural cells containing the A, B1, and B2 information. As before, a memory cell 351 stores the address of the next available cell in common overflow storage 377.

Returning now to the manner in which the secondary surveillance radar information is processed to generate the data reflected in the main data base 329, information characterizing each beacon return is supplied from the DAS output buffer 154 (FIG. 3) to the DMA memory 325 via the direct memory access 322 and the bus 160, an appropriate interrupt being communicated to the central processor 310 by the DAS interrupt lead 316. In the beginning of each radar transmit/receive cycle, i.e., preceding the sequence of received transponder returns, a communication by the DAS 100 to the processor 310 which identifies the azimuth then obtaining for the radar antenna; and the mode, i.e., whether the beacon system is operating in a mode 3 [identification code], or mode C [altitude] functional state.

The manner in which the information in the main data base 329 is generated will now be considered. Referring to FIG. 10, there is shown a further portion of the central processor memory 312 which includes a plurality of data blocks 610, each associated with a different aircraft (or other positive radar return). As a general matter, and referring briefly to FIG. 9, as the antenna for the secondary surveillance radar 14 rotates (assumed clockwise in FIG. 9) the wedge shaped emitted beam attains an orientation where an aircraft 34 is first encountered. Such an orientation is shown by the solid vector lines 30 in FIG. 9. While the angular dispersion of the admitted radar beam is narrow, it does not approach a line source and thus the aircraft 34 will generate a beacon response over most of a number of successive radar transmit/receive cycles. Upon continued further rotation, the beam radiated by the secondary radar 14 will pass through an orientation such as that shown by dashed rays 31, after which the aircraft will not respond further to the interrogation pulses on that rotational sweep of the beacon system.

The above example has considered only one aircraft 34—there will, of course, in general be a plurality of aircraft in the air space monitored by the composite FIG. 1 system, both within the bounds of any transmission by the system antennas, and for all orientations of the antennas.

The requirements for target processing are thus basically two-fold. First, as an overall matter, data must be maintained on all aircraft in the monitored air space, and that data must be updated for each 360° rotational scan of the radar to reflect the ever changing position (as in altitude and/or range) of all aircraft. Further, to determine the instantaneous azimuth of any aircraft relative to the antenna, (again referring to FIG. 9), it will be appreciated that the aircraft will issue a return during a number of successive cycles (i.e., most of those obtaining between the antenna beam positions 30 and 31). The aircraft azimuth must be determined within this range of angular orientations. This is done by computing a weighted average of those azimuth radar transmissions/reception cycles for which a positive return from the aircraft is received. This is more fully discussed below.

Returning now to FIG. 10 as above described, the CPU memory 312 includes a number of storage blocks 610, each associated with a different aircraft (or provisional aircraft) in the system. More specifically, each of the data blocks 610 shown in detail in the memory 312 of FIG. 10 comprises a plurality of storage cells for storing the range of the last positive return (cell 610); a pointer (address) to the next storage block in the target string; the beacon code of the aircraft (cell 616); the number of interrogation cycles (i.e., the number of radar transmissions—reception cycles undergone since the first positive return from the provisional target; the number of "hits"; i.e., positive returns, for the interrogation cycles (cell 622); the number of "misses"; i.e., the number of negative responses since the target was first encountered (cell 624); and an azimuth counter for storing the weighted azimuth to determine the "center of proximity" of the aircraft.

As a general matter, each target encountered in space is assigned a storage block 610 and the block 610 are ordered by increasing range i.e., by increasing contents of the storage cell $612_i$. This ordering is done by linking (the pointers of the cells $614_i$), rather than by physical arrangement of the blocks 610. For any beacon return, the central processor 310 attempts to correlate the return with a block (target) already existing in the scratch pad target memory 609. To confirm a correlation, the range of the new return must be within a close distance of the range stored in the table, (e.g., 1/16 of a mile) since any aircraft cannot progress very far between any two successive interrogations of that aircraft. When a return is correlated with an existing entry in the scratch pad memory 609, the contents of the appropriate data block are updated; i.e., the new range is noted, the number of interrogation cycles is increased by one, the number of "hits" is augmented by one, and so forth.

When no correlation is found, it is assumed that the return corresponds to a new aircraft, and a block 610 is established for that aircraft, the new block being linked within the target string in accordance with its range in the monotonic range sequence. Further, if no return is made during a transmit/receive cycle for an aircraft having a data block 610 (as by no return being within a sixteenth of a mile of its range) the interrogation and miss counters of cells 620 and 624 are incremented.

Depending upon the stored criteria, the central processor 310 examines each data block to determine whether it can "declare" the provisional target defined by the contents of each data block 610 as an actual aircraft in the system. If so, the data in the data block 610 either updates aircraft descriptors already defined in the main data base 329, further updating the corresponding display contents of the DMA memory 325 as above discussed. If the aircraft had no earlier appearance in the main data base and display memories, such is created. Correspondingly, in accordance with another appropriate criteria for data in a data block 610, the central processor 310 may conclude that the contents thereof did not correspond to an aircraft, and the block may be cleared and deleted from the target string.

The parameter for declaring no aircraft; i.e., a block 610 formed responsive to noise or a spurious multipath return may comprise a sequence of misses preceded by one or only a few positive returns ("hits"). Similarly, the parameter for declaring an aircraft may be a sequence of misses (which signifies that the radar beam has swept past the aircraft; i.e., has swept to and through the position 31 of FIG. 9, where the misses were preceded by a relatively large number of "hits" or positive returns as the beam swept across the aircraft during its progress from the position 30 to the position 31 of FIG. 9.

Specific data processing for such target examining processing will now be considered in detail, illustrative of both target declaration and the general mode of data processing as well. Such data processing is presented here in conjunction with the instruction repertoire for the above-identified Mac 16 mini computer as set forth, for example, in the Mac 16 Computer Reference Manual, copyright 1969 by Lockheed Electronics Company, Los Angeles, California, the disclosure of which is incorporated herein by reference. It will be appreciated that any computer may in fact be used to implement the data processing structure of the instant invention, and any program language used in conjunction with those computers, the following presentation being for further didactic purposes only and without limitation.

In conjunction with target examination processing, the following variables are defined:

| Variable | Parameter |
| --- | --- |
| AZ | Instantaneous azimuth. |
| ØRNG | Instantaneous range. |
| ØBC/AL | Beacon code or altitude, depending upon instantaneous beacon mode. |
| MDE | (Mode); 2 (if beacon code), 3 (if altitude). |
| 1STLØC | Storage cell corresponding to the first entry of a storage block 610 in a scratch pad memory 609. See FIG. 10 |
| DELTA | Range correlation parameter (e.g., 1/16 mile). |
| TESTK | Number of misses for target determination. |
| HITK | Number of hits for target declaration. |

To begin data processing, a central processor index register, (e.g., an index register 1) is initialized to contain the address for 1STLØC; i.e., the address of the storage cell 612 of FIG. 10, corresponding to the target nearest the radar. The program statement $$\text{LDA} \qquad \text{ØRNG} \qquad (1)$$

clears the accumulator and loads the CPU 310 accumulator with ØRNG; i.e., with the contents of a memory address defined by the variable ØRNG, which is the range of the target return being processed. The second program statement $$\text{SUB} \qquad 0,1 \qquad (2)$$

subtracts from the contents of the accumulator (the range of the target beacon return) the range of the provisional target stored in the data block 610 identified by the index register 1. During this first pass through the program, this corresponds to the range of a target nearest the antenna. Statement (2) is in essence in indirect address form, and may be read as subtract (from the accumulator) the value of the number stored in an address given by that stored in index register 1, plus the number (here zero) preceding the number "1" in the instruction.

From all that appears at this point, the return being processed can either be closer, equal, or further than the range stored in 1STLØC, depending upon whether or not the return corresponds to the aircraft of the data block 610 and upon its motion since 1STLØC was generated. Accordingly, the result of the subtraction of program statement (2) may be positive, zero or negative. A test (3)

```
    SAG         1           (3)
    JMP         LESS        (4)
``` skips instruction (4) and transfers control to the next executed instruction if the contents of the accumulator are positive or zero. Instruction (4) transfers program control to an instruction LESS (instruction No. 56) if the accumulator is negative.

Instruction (5)

```
    SUB         DELTA       (5)
    SAN         1           (6)
    JMP         MISS        (7)
``` subtract the test parameter DELTA (e.g., 1/6 of a mile) from the difference between ØRNG and 1STLØC, and instruction (6) causes instruction (7) to be skipped if the DELTA subtraction has changed the sign of the contents of the accumulator from positive or zero to negative. For this condition to obtain the target would be within 1/16th of a mile of the range stored in the scratch pad memory 609 data block 610 being considered, signalling that the target is another return for the data block already established. Accordingly, when this obtains, the data processing beginning with a HIT instruction (8) begins. If, however, the DELTA subtraction does not change the sign of the accumulator contents, the program controlled passes to an instruction MISS (No. 18).

Considering now data processing beginning with HIT instruction (8).

```
    HIT    LDA         ØRNG        (8)
``` loads the range of the beacon return into the accumulator, and instruction (9)

```
           STA         0,1         (9)
``` stores the new range into the address defined by the contents of index register 1 incremented by zero (unmodified). As seen from FIG. 10, this simply loads the new range into storage cell 612 of data block 610. For HIT sequence processing during the first pass through the instruction routine, this would correspond to the first scratch pad block 610$_t$ in FIG. 10.

Instructions

```
    LDA         ØBC/AC      (10)
    STA         *MDE,1      (11)
``` loads the accumulator with the beacon code or the altitude of the target depending upon the mode during which the return is generated, and instruction (11) stores the parameter at the appropriated memory address pursuant to instruction (11). It will be observed that instruction (11) is again of the type where the address in which the code or altitude is to be stored is given by the contents of index register 1, augmented by the value of MDE (2 for a beacon code; 3 for an altitude). A review of FIG. 10 will confirm that the beacon code or the altitude will be supplied to the proper place under control of the contents of the storage address MDE.

Instruction (12)

```
    INC         4,1         (12)
    INC         5,1         (13)
    LDA         4,1         (14)
    ADD         7,1         (15)
    STA         7,1         (16)
    JMP         GTNXT       (17)
``` increments the number of interrogations by one, this being the address upon which the increment instruction INC operates as determined by the contents of index register 1 (the address of 1STLØC augmented by 4-see FIG. 10. Instruction (13) simply increases the hit counter (cell 622, FIG. 10) by one. Instruction (14) loads the accumulator with the number of the subject interrogation (i.e., the number of emitted radar pulses since the target was first encountered); instruction (15) adds this to the weighted azimuth counter, and this total is stored by instruction (16) back into the weighted azimuth counter location. It may thus be seen that the "center of position" of the target may then be readily determined when the target is declared by normalizing the weighted azimuth counter on interrogations, and subtracting this from the antenna azimuth when the target is declared. Instruction (17) then transfers program control to an instruction GTNXT to process the next target return couplet (i.e., range and beacon code/altitude).

In accordance with the general target declaration procedure above described, targets are declared either as aircraft of a "false alarm" only after a miss, and thus no target examination need be done by the above described HIT condition corresponding to instructions (8) through (17) considered above.

It is observed at this point that a flow chart for the data processing herein described is depicted in FIG. 11 which may be reviewed in conjunction with the descriptions herein, the instruction mnemonics being the same for the listing herein and that shown on the flow chart.

We consider next the MISS condition which is entered by the transfer of instruction (7). It will be further recalled that to arrive at the MISS sequence beginning with instruction (18), the range of a return being processed will be greater than the range 1STCØC of the next code block 610 of the scratch pad memory 609 by more than the DELTA increment, indicating that the aircraft corresponding to the storage block 610 has been missed. Accordingly, instruction (18)

```
MISS         INC     4,1         (18)
             INC     6,1         (19)
``` increments the interrogation counter cell $620_i$, and instruction (19) increments the miss counter 624 (1STL0C +6-see FIG. 10).

The following instructions then determine whether there is sufficient information to declare the target as real or spurious.

```
             LDA     6,1         (20)
             SUB     TESTK       (21)
             SAG     1           (22)
             JMP     GNSPR       (23)
             LDA     5,1         (24)
             SUB     HITK        (25)
             SAG     1           (26)
             JMP     NTGT        (27)
```

Instruction (20) loads the incremented contents of the misscounter $624_i$ into the accumulator, and subtracts therefrom the contents of the parameter TESTK which is the number of misses required before a target/non-target will be called. If the result of the subtraction in the accumulator is negative test (22) fails and there are an insufficient number of misses to make a determination. Accordingly transfer (23) is made to an address GNSPR to update index register 1 with the next target block to begin another iterative sequence. Again, see the flow chart of FIG. 11.

If, however, the content of the accumulator is positive, instruction (22) causes instruction (24) to be executed, thereby loading the accumulator with the number of hits during all of the previous interrogation cycles. Instruction (25) subtracts from this the HITK parameter. If the result of the subtraction is positive, the scratch pad table in fact corresponds to an aircraft and the test of instruction (26) causes a sequence of main data base processing beginning with instruction (28) to be executed. If the test 26 fails (there is an insufficient number of hits), the contents of the scratch pad table correspond to noise, and the table is simply eliminated and ignored by a routine beginning with an instruction NTGT (no target). Program returns control to GTNXT to begin processing the next target return.

The next sequence of instructions and schematic instructions (28) through (34)

```
             LDA     2,1         (28)
             STA     BCN         (29)
             LDA     0,1         (30)
             STA     RNG         (31)
             JMM     SINCOS      (32)
             (X)     R·cos φ     (33)
             (Y)     R·sin φ     (34)
``` are executed assuming the instruction (27) has been skipped by the test of instruction (26), i.e., that the processor 310 has determined that the scratch pad storage block examined in fact corresponds to an aircraft. The process, simply stated, is one of extracting the beacon code (instruction (28)), range, (instruction 31) and the like from the scratch pad memory and storing these in beacon BCN and range RNL location 3, and the like, such that an entry can be made (or updated) in the main data base 329 of the CPU memory 312. Instructions (32) through (34) employ a call to a sin/cosine routine from which the X and Y Cartesian coordinates of the aircraft can be computed by the well known formula X = Range × cos $\phi$ and Y = Range × sin $\phi$.

For indirect address processing similar to that described above with respect to the data block 610 achieved regarding the lead address 1STL0C, the storage pattern for a data block in the main data base 329 may be viewed as having an alpha-numeric pointer in the first storage cell (zero displacement); the string pointer in the second cell (1 displacement); the display pointer in the third cell (displacement of 2); X and Y variables in the next two cells (displacements of 3 and 4); and the beacon code in the sixth cell (displacement of 5 from the lead address).

In the manner described above, the processor 310 at this point has either concluded that the scratch pad block 610 considered was a false target and fetched the next target for processing; or has concluded that the return corresponds to a real aircraft and has computed the spacial location of that aircraft. For the latter case, the program does a search on beacon code to determine whether or not the beacon code of the scratch pad block is already in the main data base 329 (as by tracing through the appropriate linked string). If so, the data base there must be updated, but no new storage block need be created. On the other hand, if no beacon code match is found, a new block in the main data base 329 must be created. We consider the two possibilities in turn.

Treating first the case where a match was found for the beacon code and only updating is required, instructions (35)

```
             LDA     X           (35)
             STA     3,1         (36)
             LDA     Y           (37)
             STA     4,1         (38)
``` fetches the recently computed value of X (i.e., the X coordinate of the aircraft during the last beacon return) and stores this in the fourth cell of the subject block in the main data base 329. A review of FIG. 8 will confirm that this corresponds to the X parameter stored in the location corresponding to cell 333. Similarly, instructions (37) and (38) update the Y parameter.

Instructions (39)

```
             LDX     2,1         (39)
             LDA     X           (40)
             STA     1           (41)
             LDA     Y           (42)
             STA     1           (43)
             —
             JMP     GTNXT       (44)
``` employs indirect addressing to load an index register 1 with the pointer of cell 332 of FIG. 8, i.e., the address in the first controller's display allotment in the DMA memory 325 which corresponds to the subject aircraft. Instructions (40) and (41) load and store the updated X parameter into display storage, and instructions (42) and (43) update the Y display coordinate for the aircraft. Accordingly, the next time the display for the subject controller is refreshed by the direct memory channel from the storage block 352, the position of the alphanumeric presentation to the aircraft will shift (slightly) to correspond to the new position of the aircraft. It will be recalled that the skin return of the aircraft, i.e., that provided by the primary surveillance radar 12, is not affected by any of the above. However, the aircraft having moved, the position of this ASR produced spot shifts slightly also in the same direction as the moved alpha-numeric presentation, and both are maintained in proximate relation.

The above described updating of the display storage continues in a manner parallel to that above described, the index register being loaded by the pointers in each display block to increment the X and Y locating variables for the aircraft appearance in the display blocks associated with all other controllers. Other parameter updating obtains as well in this fashion.

When this is completed, instruction (44) is a jump to GTNXT to process the next target return.

Treating next the case where there had been no prior appearance of the target in the main data base 329, such is provided by instructions (45), through (55),

```
        LDA     PTR             (45)
        STA     1,1             (46)
        LDA     DPTN            (47)
        STA     2,1             (48)
        LDA     X               (49)
        STA     3,1             (50)
        LDA     Y               (51)
        STA     4,1             (52)
        LDA     BCN             (53)
        STA     5,1             (54)
        —
        JMP     GTNXT           (55)
```

The storage assignment program of the computer loads the accumulator with the pointer (PTR) to the next string entry. This string pointer is then stored in the second cell 331 in the MDB 329 (instruction (46)). Similarly, a link (address) DPTN to a display location is loaded into a MDB address 332 by instructions (47), and (48). Instructions (49) and (50) store the X coordinate in the MDB; instructions (51) and (52) store the Y coordinate; and instructions (53) and (54) store the beacon code. In the manner paralleling that above described, the display storage in the DMA memory 325 is then created for each controller, and loaded with the location of the aircraft, together with such alpha-numeric information as may be appropriate. Finally, instruction (55) again transfers information to GTNXT to process the next radar return.

Finally, for the target examination/declaration process, we consider system functioning beginning with an instruction LESS to which control is transferred by instruction (4) if the initial test (3) fails, i.e., if the range of the target being processed is less than 1STL0C.

```
LESS    ADD     DELTA           (56)
        SAN     1               (57)
        JMP     HIT             (58)
        JMP     NBLK            (59)
```

Instruction (56) increases the negative contents of the accumulator and, if DELTA is sufficient to cause a change of sign (indicating that the target correlates with the scratch pad block being examined) test 57 fails and instruction (58) causes a transfer to the HIT routine for operation above described. If, however, DELTA is not sufficient to change the sign of the accumulator contents, the skip on negative instruction (57) causes a transfer to an instruction NBCK (see FIG. 11) which causes a new block to be established in the scratch pad memory. The following instruction (60) causes a jump to FETCH to begin to obtain the next target.

```
        JMP     FETCH           (60)
```

Finally, instructions (61) and (62)

```
GNSPR   LDX     1,1             (61)
        JMP     START           (62)
``` disclosed GNSPR processing with respect to the transfer of instruction (23).

By way of summary then, the above description has presented the automated radar terminal system in accordance with the present invention in overview, and has considered the functional operation of the specific circuit parts employed therein. The organization and functioning of the CPU and DMA memories 312 and 325 has been treated as has the manner in which provisional target information is processed, and selectively converted into main data base entries for display storage generation.

It will be appreciated from the above description that the automated system of the instant invention provides all that is necessary to accept the continuous stream of video and control signals of the primary and secondary surveillance radars 12 and 14 and the control structure associated therewith; to process such returns; and, as a system output, display the position, path of travel and identification of aircraft in a monitored air space.

The above described system and system function is merely illustrative of the principles of the present invention. Numerous adaptations and variations thereof and will be apparent to those skilled in the art without departing from the spirit and scope of the present invention.

What is claimed is:

1. In combination in an automated radar data processing system for displaying alpha-numeric information characterizing beacon wave returns generated by aircraft-mounted transponders within the area of said system responsive to secondary surveillance radar interrogations and a primary surveillance radar video wave produced by non-cooperative reflections from said aircraft; said system comprising data acquisition means for receiving said beacon wave returns, said data acquisition means including means for providing a regenerated beacon code wave, a digital range wave characterized by a monotonically increasing value related to the time elapsed since the last emitted secondary surveillance radar interrogation, and digital azimuth information corresponding to the orientation of the secondary surveillance radar when the last transponder interrogation pulse was issued therefrom; data processing means for receiving said signals provided by said data acquisition means; and display means, including plural displays, for displaying alpha-numeric information supplied thereto by said data processing means and for displaying said primary surveillance radar video wave which is supplied thereto; said data processing means includes memory means, said memory means including plural storage means each associated with a different one of said displays, each of said plural storage means including plural storage subportions thereof for storing data characterizing the display presentation to be made for different ones of subject aircraft within the area of said system, subportions of said plural storage means relating to a like aircraft being linked together by stored pointers therein, said memory means including main data base storage means therein, said main data base storge means including plural subportions therein each associated with a different one of the aircraft within the area of said system, said subportions of said main data base storge means including linking means for storing the address of a subportion of one of said plural storage means storing the display information with respect to a like aircraft.

2. A combination as in claim 1, wherein said memory means of said data processing means comprises first and second memories, said main data base storage means being included in a first one of said memories, and said plural storage means including said display information being included in a second one of said memories.

3. A combination as in claim 2 wherein said data processing means includes central processor means including means for communicating with each of said first and second memories, and direct access means for connecting said data acquisition means and said plural displays to said second memory.

4. A combination as in claim 1 wherein said data processing means includes a central procesor, and wherein said memory means includes first and second information retaining means, said plural storage means being included within said second information retaining means, and direct memory access means for connecting said data acquisition means and said plural displays to said second information retaining means.

5. A combination as in claim 1 wherein said data acquisition means includes range means responsive to an input range trigger pulse for generating said digital range wave, said range means comprising a range oscillator and a range counter.

6. A combination as in claim 5 further comprising means responsive to said range trigger for initializing the state of said range counter.

7. A combination as in claim 6 wherein said range counter initializing means includes a register, and gating means for presetting said range counter with the contents of said register.

8. A combination as in claim 1 wherein said data acquisition means includes azimuth generating means, and means for supplying an azimuth reference pulse and an azimuth change pulses to said azimuth generating means.

9. A combination as in claim 8 wherein said azimuth reference pulse and azimuth change pulse supplying means includes a synchro-to-reference and change pulse converter.

10. A combination as in claim 8 wherein said azimuth signal generating means comprises an azimuth counter advanced by said azimuth change pulses, and means responsive to each azimuth reference pulse for initializing said azimuth counter.

11. A combination as in claim 10 wherein said azimuth initializing means comprises a register, and gating means responsive to said azimuth reference pulse for presetting said azimuth counter.

12. A combination as in claim 1 wherein said data acquisition means includes a beacon reply circuit.

13. A combination as in claim 12 wherein said beacon reply circuit comprises means for receiving said beacon return wave, means for delaying said beacon return wave, and coincidence means responsive to a direct and delayed beacon return wave signals for signalling when a proper beacon reply message is encountered.

14. A combination as in claim 13 further comprising a beacon clock, and means for sampling the beacon return wave at a relatively high rate given by said beacon clock in synchronization with said beacon clock wave.

15. A combination as in claim 14 further comprising disjunctive logic means for signalling the incidence of a proper beacon message when coincidence is obtained between the direct beacon wave and any of plural selected outputs from said beacon wave delaying means.

16. A combination as in claim 15 wherein said beacon wave delaying means comprises a plural stage shift register cycled by said beacon clock.

17. A combination as in claim 13 further comprising at least one processor, storge shift register means for receiving the beacon wave output of said beacon wave delaying means, beacon reply output shift register means, and means for transferring the contents of said storage shift register means to said beacon reply output shift register means.

18. A combination as in claim 17 wherein said beacon reply output shift register means includes a portion for receiving a measure of said range wave.

19. A combination as in claim 13 wherein said beacon reply circuit includes at least two processors, storage shift register storage means in each of said processors for receiving beacon wave signals, means for commutating information present at the output of said beacon wave delaying means between said plural processors, means for signalling when information is being transferred into the storage shift register of either processor, and garbled message detector means responsive to signals that said plural processors are coincidentally entering information into the storage shift registers thereof at a time when a signal obtains at the output of said beacon wave delaying means for providing a garbled message indication.

20. A combination as in claim 12 wherein said beacon reply circuit includes garbled message detecting means.

21. A combination as in claim 1 wherein said data acquisition means comprises analog decoder means for selctively supplying display marker signals to said display means.

22. A combination as in claim 21 further comprising register means for receiving a return beacon code wave, plural registers loaded with a beacon code, and plural digital comparators each responsive to the contents of said beacon code storing register means, and to the contents of an associated one of said beacon code storing registers for selectively supplying an output signal upon a match therebetween.

23. A combination as in claim 22 further comprising at least one flag—generating voltage marker source, and interconnection means responsive to a match output from one of said comparators for generating an output from said marker source.

24. A combination as in claim 23 further comprising plural distinct marker sources, and wherein said interconnection means comprises matrix means connected between said comparator outputs and said marker sources.

25. A combination as in claim 24 wherein at least one of said marker sources includes an oscillator, a counter advanced by said oscillator, and a decoder connected to said counter.

26. A combination as in claim 25 wherein said decoder includes plural outputs, and disjunctive logic means connected to selected of said decoder outputs.

27. A combination as in claim 26 wherein a subset of said registers include adjustable switch means.

28. A combination as in claim 23 further comprising signal summing means, means connecting the output of said marker source to said summing means, and means connecting the primary surveillance radar video wave to said summing means.

29. A combination as in claim 1 wherein said data processing means includes a central processor, said central processor including plural signal interrupt ports, means connecting said data acquisition means to one of said central processor interrupt ports, and means connecting said plural displays to others of said central processor interrupt ports.

30. A combination as in claim 29 wherein said memory means includes a first and second store, said second store including said plural storage means, means connecting said second store for bilateral signal propagation with said central processor, direct memory access means connected to said second store, said direct memory access means including selector data channel multiplexing means comprising a plurality of access ports, said data acquisition means being connected to a first one of said ports for supplying information directly to said second store, and means connecting said plural displays to others of said plural selector data channel multiplexing ports for receiving information from said plural storage means of said second store.

31. A combination as in claim 29 further comprising multiplexing means connected to said central processor controller actuatable signalling means associated with at least one of said plural displays, and means connecting each of said controller signalling means to said multiplexer.

32. A combination as in claim 31 further comprising modem means connecting to said multiplexer.

33. A combination as in claim 31 further comprising peripheral store means connected to said multiplexer.

34. A combination as in claim 1 wherein at least one of said plural display means comprises a cathode ray tube, gross and fine deflection means coupled to said cathode ray tube, first and second deflection sources, switch means for selectively connecting said gross deflection means with said first deflection source, a sweep generator connected to said switch means, and alpha-numeric coordinate position source means connected to said switch means.

35. A combination as in claim 33 wherein said second deflection source comprises alpha-numeric and leader generators, and means for driving said fine deflection means responsive to the output of generator means.

36. A combination as in claim 35 further comprising further switch means synchronized with said switch means for selectively intensity modulating the beam of said cathode ray tube with the primary radar video wave and with outputs from said alpha-numeric and leader generators.

37. A combination as in claim 1 wherein said memory means includes a scratch pad provisional aircraft target store, said store being divided into a plurality of aircraft storage blocks, each of said storage blocks having range storage means, said blocks being ordered by the contents of said range storing means, each of said blocks including storage means for storing a pointer to the block of next larger range.

38. A combination as in claim 1 wherein said memory means comprises first memory means including said main data base storage means, said main data base storage means being sub-divided into storage blocks each associated with a different declared aircraft, said aircraft declared blocks being ordered, each of said blocks including means for storing a pointer to a succeeding storage block.

39. A combination as in claim 38 wherein said first memory means further comprises hash list storage means, said aircraft characterizing blocks of said main data base storing means being subdivided in accordance with a hash code, said hash list storage means storing an address of an element in the corresponding hash list string.

40. A combination as in claim 39 wherein plural of said plural storage means each includes a storage portion associted with each said storage block of said main data base storage means, each of said storage portions including a pointer address to the next following one of said plural storage means, each block of said main data base storage means including means for storing a pointer to one of said plural storage means.

41. A combination as in claim 1 wherein said memory means includes scratch pad memory means, said scratch pad memory means including therein plural storage blocks each associated with one or more beacon return waves previously encountered by said system, said data processing means including means for seeking a correlation between each beacon return wave and one of said scratch pad storage blocks.

42. A combination as in claim 41 further comprising means responsive to said correlation seeking means detecting a correlation by updating the contents of said correlated block in said scratch pad memory means.

43. A combination as in claim 42 wherein said data processing means further comprises means responsive to said correlation seeking means not signalling an existing correlation for a beacon return signal for establishing a new storage block in said scratch pad memory means.

44. A combination as in claim 43 further comprising target declaration and rejecting means for examining said storage blocks of said scratch pad memory means for selectively causing a new entry in said main data base storage means in said memory means.

45. A combination as in claim 1 further comprising primary and secondary surveillance radar means for radiating interrogation pulse in s spatially confined, rotating air space zone.

* * * * *